(12) United States Patent
Foody et al.

(10) Patent No.: US 10,760,024 B2
(45) Date of Patent: Sep. 1, 2020

(54) METHOD AND SYSTEM FOR UPGRADING BIOGAS

(71) Applicant: Iogen Corporation, Ottawa (CA)

(72) Inventors: Patrick J. Foody, Ottawa (CA); John Dechman, Ottawa (CA)

(73) Assignee: Iogen Corporation, Ottawa, Ontario (CA)

( * ) Notice: Subject to any disclaimer, the term of this patent is extended or adjusted under 35 U.S.C. 154(b) by 0 days.

(21) Appl. No.: 16/556,944

(22) Filed: Aug. 30, 2019

(65) Prior Publication Data

US 2020/0017787 A1 Jan. 16, 2020

Related U.S. Application Data

(63) Continuation of application No. PCT/CA2019/000104, filed on Jul. 9, 2019.

(60) Provisional application No. 62/696,006, filed on Jul. 10, 2018.

(51) Int. Cl.
*C10L 3/10* (2006.01)
*B01D 53/75* (2006.01)
*B01D 53/047* (2006.01)

(52) U.S. Cl.
CPC .............. *C10L 3/103* (2013.01); *B01D 53/75* (2013.01); *C10L 3/104* (2013.01); *C10L 3/105* (2013.01); *C10L 3/106* (2013.01); *B01D 53/047* (2013.01); *B01D 2257/102* (2013.01); *B01D 2257/304* (2013.01); *B01D 2257/504* (2013.01); *B01D 2257/80* (2013.01); *B01D 2258/05* (2013.01)

(58) Field of Classification Search
CPC .. C10L 3/10; C10L 3/101; C10L 3/103; C10L 3/104; B01D 53/52; B01D 53/62; B01D 53/75
See application file for complete search history.

(56) References Cited

U.S. PATENT DOCUMENTS

| | | | |
|---|---|---|---|
| 4,380,242 A | 4/1983 | Bresie et al. | |
| 5,570,729 A | 11/1996 | Mutter | |
| 5,603,360 A | 2/1997 | Teel | |

(Continued)

FOREIGN PATENT DOCUMENTS

| | | |
|---|---|---|
| CA | 2820733 C | 7/2017 |
| DE | 102013011289 A1 | 1/2015 |

(Continued)

OTHER PUBLICATIONS

International Search Report issued in PCT Application No. PCT/CA2019/000104 dated Oct. 18, 2019.

(Continued)

*Primary Examiner* — Ellen M McAvoy
(74) *Attorney, Agent, or Firm* — Knobbe Martens Olson & Bear LLP

(57) ABSTRACT

A method for providing renewable natural gas (RNG) includes removing hydrogen sulfide and/or carbon dioxide from biogas to provide partially purified biogas, which may be stored in a mobile storage tank. The partially purified biogas is transported to a biogas upgrading facility, at least partially by truck, rail, or ship. At the biogas upgrading facility, the partially purified biogas is further purified to provide the RNG, which can be injected into a distribution system (e.g., natural gas grid) and/or provided for use in transportation.

22 Claims, 6 Drawing Sheets

(56) References Cited

U.S. PATENT DOCUMENTS

| | | | |
|---|---|---|---|
| 7,691,182 B1 | 4/2010 | Muradov et al. | |
| 8,007,567 B2 | 8/2011 | Roe et al. | |
| 8,373,305 B2 | 2/2013 | Adam et al. | |
| 8,404,025 B2 | 3/2013 | Frisbie et al. | |
| 8,549,877 B2 | 10/2013 | Santos | |
| 8,658,026 B2 | 2/2014 | Foody et al. | |
| 8,753,854 B2 | 6/2014 | Foody | |
| 8,833,088 B2 | 9/2014 | Bayliff et al. | |
| 8,945,373 B2 | 2/2015 | Foody | |
| 8,999,036 B2 | 4/2015 | Pierce | |
| 9,040,271 B2 | 5/2015 | Foody | |
| 9,222,048 B1* | 12/2015 | Foody | C10L 3/06 |
| 9,234,627 B2 | 1/2016 | Cajiga et al. | |
| 9,243,190 B2 | 1/2016 | Patience et al. | |
| 9,506,605 B2 | 11/2016 | Paget et al. | |
| 9,535,045 B2* | 1/2017 | Gerhold | G01N 33/0016 |
| 9,625,097 B2 | 4/2017 | Bayliff et al. | |
| 9,625,099 B2 | 4/2017 | Ding | |
| 9,644,792 B2 | 5/2017 | Moszkowski et al. | |
| 9,863,581 B2 | 1/2018 | Santos et al. | |
| 10,093,540 B2 | 10/2018 | Foody | |
| 10,132,447 B2 | 11/2018 | Whiteman et al. | |
| 10,183,267 B2 | 1/2019 | Day et al. | |
| 10,202,622 B2 | 2/2019 | Foody et al. | |
| 10,421,663 B2* | 9/2019 | Foody | C01B 3/36 |
| 2003/0225169 A1 | 12/2003 | Yetman | |
| 2006/0213370 A1 | 9/2006 | Leonard et al. | |
| 2008/0134754 A1 | 6/2008 | Funk | |
| 2010/0000153 A1 | 1/2010 | Kurkjian et al. | |
| 2012/0308989 A1 | 12/2012 | Barclay et al. | |
| 2013/0161235 A1* | 6/2013 | Foody | C10L 3/08 208/89 |
| 2013/0183705 A1 | 7/2013 | Barclay et al. | |
| 2013/0224808 A1 | 8/2013 | Bell et al. | |
| 2014/0370559 A1 | 12/2014 | Oakley et al. | |
| 2015/0345708 A1 | 12/2015 | Sloan et al. | |
| 2016/0247183 A1* | 8/2016 | Foody | C01B 3/34 |
| 2017/0074583 A1* | 3/2017 | Tremblay | B01F 15/00259 |
| 2017/0130901 A1 | 5/2017 | Sloan et al. | |
| 2018/0079672 A1* | 3/2018 | Meyer | B01D 53/1493 |
| 2018/0094772 A1 | 4/2018 | Santos et al. | |
| 2018/0112142 A1 | 4/2018 | Foody et al. | |
| 2018/0155649 A1* | 6/2018 | Gerhold | G05D 21/02 |
| 2019/0001263 A1* | 1/2019 | Prince | B01D 53/002 |
| 2019/0030482 A1* | 1/2019 | Ding | C10L 3/105 |
| 2019/0144890 A1 | 5/2019 | Subbian et al. | |
| 2019/0144895 A1 | 5/2019 | Foody et al. | |
| 2019/0185884 A1 | 6/2019 | Foody | |
| 2019/0262770 A1* | 8/2019 | Thygesen | B01D 53/52 |

FOREIGN PATENT DOCUMENTS

| | | |
|---|---|---|
| EP | 0207277 B1 | 1/1990 |
| EP | 3085766 A1 | 10/2016 |
| WO | WO 2010/006910 | 1/2010 |
| WO | WO 2017/195103 | 11/2017 |
| WO | 2018144328 A1 | 8/2018 |
| WO | WO 2019185315 | 10/2019 |

OTHER PUBLICATIONS

European Biogas Association; "Good Practices and Innovations in the Biogas Industry", 2018, downloaded from http://european-biogas.eu/wp-content/uploads/2018/02/Success-Stories-EBA-2018.pdf on Aug. 28, 2019.

Hengeveld, E.J.; Bekkering, J.; van Gernert, W.J.T.; and Broekhuis, A.A.; "Biogas infrastructures from farm to regional scale, prospects of biogas transport grids", Biomass and Bioenergy, 86 (2016) 43-52.

Hjort, Anders; and Tamm, Daniel; "Transport Alternatives for Biogas", BioMil AB.

Hovland, Jon; "Compression of raw biogas—A feasibility study", Report No. 2217020-1 (2017).

Krich, Ken.; Augenstein, Don; Batmale, JP; Benemann, John, Rutledge; Brad, and Salour, Dara; "Biomethane from Dairy Waste A Sourcebook for the Production and Use of Renewable Natural Gas in California", Chapter 4, downloaded from http://www.suscon.org/pdfs/cowpower/biomethaneSourcebook/Chapter_4.pdt on Aug. 23, 2019.

Munoth, Kailash Kumar Jain; "Models for Decanting Gaseous Fuel Tanks: Simulations with GFSSP Thermal Model", (2016), Mechanical (and Materials) Engineering—Dissertations, University of Nebraska-Lincoln.

Privat, Romain and Jaubert, Jean Noel; "Predicting the Phase Equilibria of Carbon Dioxide Containing Mixtures Involved in CCS Processes Using the PPR78 Model," Chapter 15.

Torresani, Mark J., and Bloomenkranz, Bill; "Renewable Natural Gas Delivery Options. Getting your RNG to market" (2018), Tetra Tech, Swanapalooza, Denver Colorado.

Kapoor, Rimika Madan; and Vijay, Virendra K; "Seventh Framework Programme Theme Energy", downloaded on Aug. 27, 2019. Available at http://www.valorgas.soton.ac.uk/Deliverables/120825_VALORGAS_241334_D5-2_rev[0].pdf.

Vitu, Stephane; Privat, Romain; Jaubert, Jean-Noel; and Mutelet, Fabrice; "Predicting the phase equilibria of CO2 + hydrocarbon systems with the PPR78 model (PR EOS and kij calculated through a group contribution method)", J. of Supercritical Fluids, 45 (2008), 1-26.

* cited by examiner

US 10,760,024 B2

METHOD AND SYSTEM FOR UPGRADING BIOGAS

INCORPORATION BY REFERENCE TO ANY PRIORITY APPLICATIONS

This application is a continuation of PCT/CA2019/000104, filed Jul. 9, 2019, which claims the benefit of U.S. Provisional Application No. 62/696,006, filed Jul. 10, 2018, both of which are incorporated by reference herein in their entireties.

TECHNICAL FIELD

The present disclosure relates to a method and system for upgrading biogas, and in particular, relates to a method and system for upgrading biogas to renewable natural gas (RNG) that includes the partial purification of the biogas followed by transport.

BACKGROUND

Biogas, which is a mixture of several gases, is typically produced by the breakdown of organic matter in low oxygen conditions. In particular, it may be produced by the anaerobic digestion or fermentation of organic matter (e.g., manure, sewage sludge, municipal solid waste, biodegradable waste, biodegradable feedstock, etc.).

Biogas collected at its source (e.g., a landfill or anaerobic digester) may be referred to as raw biogas. The composition of raw biogas, which may vary with the type of organic matter from which it is derived, is predominately methane ($CH_4$) and carbon dioxide ($CO_2$), with small and/or negligible amounts of nitrogen ($N_2$), hydrogen sulfide ($H_2S$), water ($H_2O$), ammonia ($NH_3$), hydrogen ($H_2$), carbon monoxide (CO), oxygen ($O_2$), volatile organic compounds (VOCs), and/or siloxanes. For example, without being limiting, the composition of raw biogas may include about 60% $CH_4$ (e.g., between about 35% and about 75%), about 35% $CO_2$ (e.g., between about 15% and about 65%), about 0-20% $N_2$, and about 0-5% $O_2$.

While raw biogas may have sufficient energy content to be combusted (e.g., in an engine, turbine, or boiler) without removing inert components such as $CO_2$ and/or $N_2$, another option is to upgrade the raw biogas for injection into a natural gas distribution system. Biogas upgrading refers to a process that increases the calorific value of biogas by removing at least $CO_2$ and/or $N_2$, and typically some other contaminants, thereby increasing the relative amount of $CH_4$. When raw biogas is upgraded to the extent that it meets applicable specifications of the natural gas distribution system (e.g., pipeline standards) and/or is suitable for use in the transportation sector, it is referred to as "renewable natural gas." Renewable natural gas (RNG) is substantially interchangeable with natural gas and thus can be used as a substitute for fossil natural gas, can be injected into the natural gas distribution system, and/or can be used as a transportation fuel where it can qualify for fuel credits.

In general, when raw biogas is upgraded to RNG, the biogas upgrading is associated with relatively high capital investment costs, and as a result, is not generally economically feasible for biogas producers having a low volume production (e.g., small farms, small landfills, or small wastewater treatment facilities).

SUMMARY

The present disclosure describes an improved method and/or system for upgrading biogas wherein raw biogas is partially purified (e.g., at a pre-processing site near the source of raw biogas) prior to being transported to a centralized biogas upgrading facility where the partially purified biogas is further purified to renewable natural gas (RNG). The RNG can be injected into a natural gas distribution system, or can be used to provide compressed natural gas (bio-CNG) or liquefied natural gas (bio-LNG) to an off-grid industrial site or filling station (e.g., a commercial fuel station).

Advantageously, since the centralized biogas upgrading facility can receive biogas from a plurality of sources (e.g., a plurality of pre-processing sites and/or raw biogas from one or more other sources), the biogas upgrading can profit from the economies of scale.

Further advantageously, since the partial purification can be conducted prior to transport to the centralized biogas upgrading facility, the process/system is more efficient. For example, when the partial purification includes removing contaminates such as $H_2O$ and $H_2S$, this can reduce corrosion problems and/or safety issues. When the partial purification includes removing $CO_2$, this can improve the compression process and/or allow more methane to be transported per unit of volume at a given pressure, and thus reduce costs.

In accordance with one aspect of the instant invention there is provided a method comprising: a) obtaining biogas from a plurality of biogas sources, including a first biogas from a first biogas source and a second other biogas from a second other biogas source; b) removing one or more components from the first biogas to produce a first partially purified biogas, said one or more components comprising hydrogen sulfide, carbon dioxide, or a combination thereof, said one or more components removed using at least one stationary purification system; c) transporting a first vessel containing the first partially purified biogas to a biogas upgrading facility; d) removing one or more components from the second biogas to produce a second partially purified biogas, said one or more components comprising hydrogen sulfide, carbon dioxide, or a combination thereof, said one or more components removed using at least one stationary purification system; e) optionally, transporting a second vessel containing the second partially purified biogas to the biogas upgrading facility; f) at the biogas upgrading facility, removing at least one component from a gas stream comprising the first partially purified biogas, the second partially purified biogas, or a combination thereof, to produce renewable natural gas having a heating value that is greater than a heating value of any one of the first and second partially purified biogases; g) providing the renewable natural gas produced in f) for injection into a distribution system, for use as a transportation fuel, or for a combination thereof.

In accordance with one aspect of the instant invention there is provided a method comprising: a) obtaining biogas from a plurality of biogas sources, including a first biogas from a first biogas source and a second other biogas from a second other biogas source; b) feeding the first biogas into a first stationary purification system to remove hydrogen sulfide, carbon dioxide, or a combination thereof from the first biogas and produce a first partially purified biogas having a heating value less than 950 BTU/scf; c) transporting a first vessel containing the first partially purified biogas to a biogas upgrading facility by vehicle; d) feeding the second biogas into a second other stationary purification system to remove hydrogen sulfide, carbon dioxide, or a combination thereof from the second biogas and produce a second partially purified biogas having a heating value less than 950 BTU/scf; e) optionally, transporting a second vessel containing the second partially purified biogas to the biogas upgrading facility by vehicle; f) at the biogas upgrading facility, feeding the first and second partially purified biogases into one or more purification systems to remove carbon dioxide, nitrogen, oxygen, or any combination thereof and to produce renewable natural gas having a heating value that is at least 950 BTU/scf; and g) providing renewable natural gas produced in f) for injection into a distribution system, for use as a transportation fuel, or for a combination thereof.

In accordance with one aspect of the instant invention there is provided a method for upgrading biogas comprising: (a) obtaining biogas from a biogas source; (b) producing partially purified biogas from the biogas, said producing comprising removing hydrogen sulfide, carbon dioxide, or a combination thereof from the biogas using at least one stationary purification system; (c) filling a vessel with the partially purified biogas; (d) transporting the vessel containing the partially purified biogas to a destination; (e) at the destination, removing the partially purified biogas produced from the vessel; (f) purifying a gas stream comprising partially purified biogas removed from the vessel to produce renewable natural gas; and (g) providing the renewable natural gas for injection into a natural gas distribution system, use as a transportation fuel, or a combination thereof.

In accordance with one aspect of the instant invention there is provided a method of upgrading biogas comprising: obtaining partially purified biogas from a plurality of pre-processing sites, each pre-processing site including a source of biogas, a stationary purification system for producing the partially purified biogas, and a vessel for storing the partially purified biogas at a pressure of at least 1000 psig; transporting each vessel containing partially purified biogas directly to a biogas upgrading facility; removing the partially purified biogas from each vessel at the biogas upgrading facility; further purifying the partially purified biogas removed from each vessel to provide renewable natural gas, where the renewable natural gas has a heating value of at least 950 BTU/scf and is for injection into a distribution system, for use as a transportation fuel, or a combination thereof.

In accordance with one aspect of the instant invention there is provided a method for upgrading biogas comprising: at a first location, providing a first stationary biogas purification system for processing biogas from a first biogas source; at a second location, providing a second other stationary biogas purification system for processing biogas from a second other biogas source; collecting or arranging for the collection of partially purified biogas produced at each of the first and second locations, said collecting comprising coupling a vessel or a container supporting the vessel to a truck, rail car, or ship, and transporting the vessel, where the vessel contains partially purified biogas produced at the first or second location; and producing renewable natural gas from the transported partially purified biogas, said producing comprising removing carbon dioxide, nitrogen, oxygen, or any combination thereof, from the transported partially purified biogas.

In accordance with one aspect of the instant invention there is provided a method of upgrading biogas comprising: at a pre-processing site, removing water, hydrogen sulfide, carbon dioxide, or any combination thereof from raw biogas to produce partially purified biogas, compressing the partially purified biogas, and feeding the compressed partially purified biogas to a vessel as it is produced, said vessel decoupled from a vehicle; transporting the partially purified biogas to a biogas upgrading facility, said transporting comprising moving said vessel by vehicle; at the biogas upgrading facility, decoupling the vessel from the vehicle and removing the partially purified biogas therefrom; further purifying the partially purified biogas removed to produce renewable natural gas; and providing the renewable natural gas for injection into a natural gas distribution system, for use as a transportation fuel, or a combination thereof.

DETAILED DESCRIPTION

Figure 1:
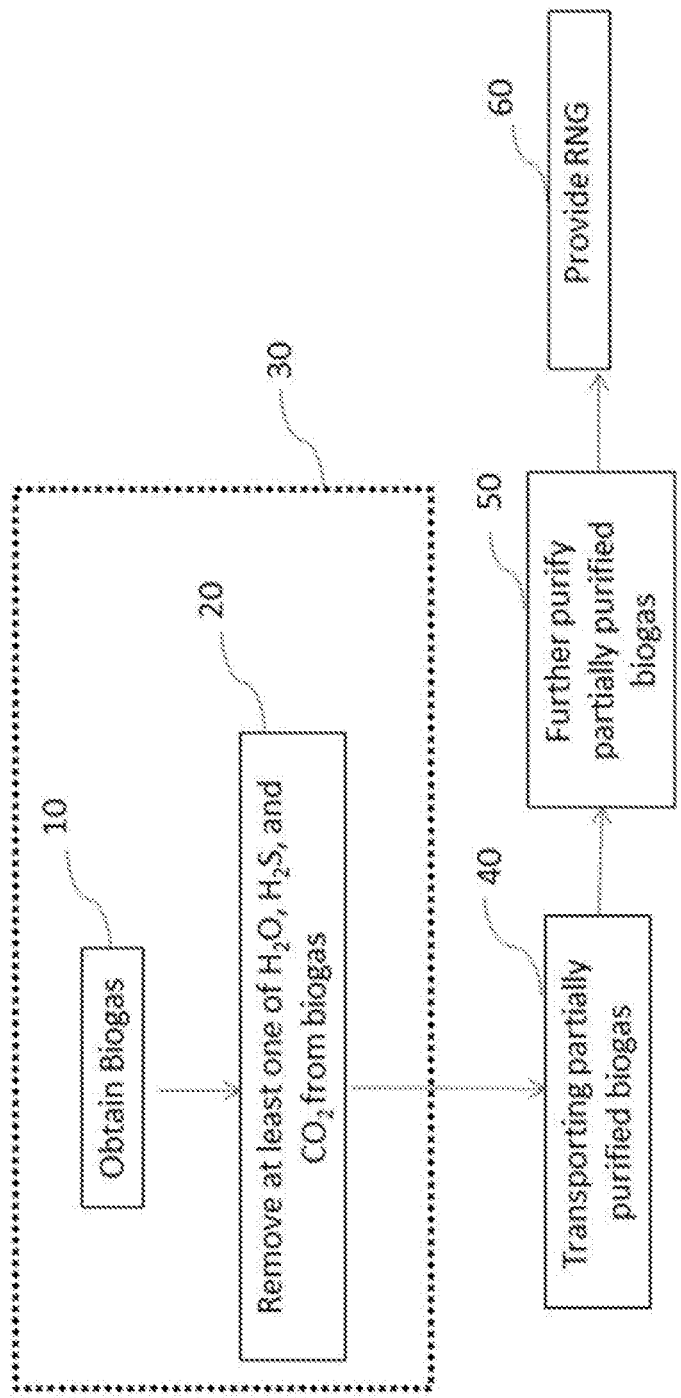
FIG. 1 is a flow diagram of a method according to one embodiment of the invention.

Certain exemplary embodiments of the invention now will be described in more detail, with reference to the drawings, in which like features are identified by like reference numerals. The invention may, however, be embodied in many different forms and should not be construed as limited to the embodiments set forth herein. The terminology used herein is for the purpose of describing certain embodiments only and is not intended to be limiting of the invention. For example, as used herein, the singular forms "a," "an," and "the" may include plural references unless the context clearly dictates otherwise. The terms "comprises", "comprising", "including", and/or "includes", as used herein, are intended to mean "including but not limited to." The term "and/or", as used herein, is intended to refer to either or both of the elements so conjoined. The phrase "at least one" in reference to a list of one or more elements, is intended to refer to at least one element selected from any one or more of the elements in the list of elements, but not necessarily including at least one of each and every element specifically listed within the list of elements. Thus, as a non-limiting example, the phrase "at least one of A and B" may refer to at least one A with no B present, at least one B with no A present, or at least one A and at least one B in combination. In the context of describing the combining of components by the "addition" or "adding" of one component to another, or the separating of components by the "removal" or "removing" of one component from another, those skilled in the art will understand that the order of addition/removal is not critical (unless stated otherwise). The terms "remove", "removing", and "removal", with reference to one or more impurities, contaminants, and/or constituents of biogas, includes partial removal. The terms "cause" or "causing", as used herein, may include arranging or bringing about a specific result (e.g., a withdrawal of a gas), either directly or indirectly, or to play a role in a series of activities through commercial arrangements such as a written agreement, verbal agreement, or contract. The term "associated with", as used herein with reference to two elements (e.g., a fuel credit associated with the transportation fuel), is intended to refer to the two elements being connected with each other, linked to each other, related in some way, dependent upon each other in some way, and/or in some relationship with each other. The terms "first", "second", etc., may be used to distinguish one element from another, and these elements should not be limited by these terms. The term "plurality", as used herein, refers to two or more. Unless defined otherwise, all technical and scientific terms used herein have the same meanings as commonly understood by one of ordinary skill in the art.

Referring to FIG. 1, there is shown a method in accordance with one embodiment of the invention. In 10, raw biogas is obtained (e.g., withdrawn from the source). In 20, the raw biogas, which contains both $CH_4$ and $CO_2$, is subject to a partial purification process (e.g., that removes at least one of $H_2O$, $H_2S$, and $CO_2$) to produce partially purified biogas. In 40, the resulting partially purified biogas is collected and/or transported (e.g., by truck, rail, or ship). In 50, the partially purified biogas is further purified to produce RNG. The RNG is provided to a user 60 and/or distribution system.

The term "biogas", as used herein, refers to a gas mixture that contains methane produced from the anaerobic digestion of organic matter. Raw biogas refers to biogas before it is treated to remove any chemical components (e.g., $CO_2$, $H_2S$, $H_2O$, $N_2$, $NH_3$, $H_2$, CO, $O_2$, VOCs, and/or siloxanes). Partially purified biogas refers to biogas that has been treated to remove non-methane components (e.g., $CO_2$, $H_2S$, $H_2O$, $N_2$, $NH_3$, $H_2$, CO, $O_2$, VOCs, and/or siloxanes), and requires further purification in order to meet pipeline specifications (e.g., it may contain one or more non-methane components in an amount that causes it to fall short of meeting natural gas pipeline standards or specifications). The term "biogas", as used herein, encompasses raw biogas and partially purified biogas, but does not encompass RNG, unless specified otherwise.

Figure 2:
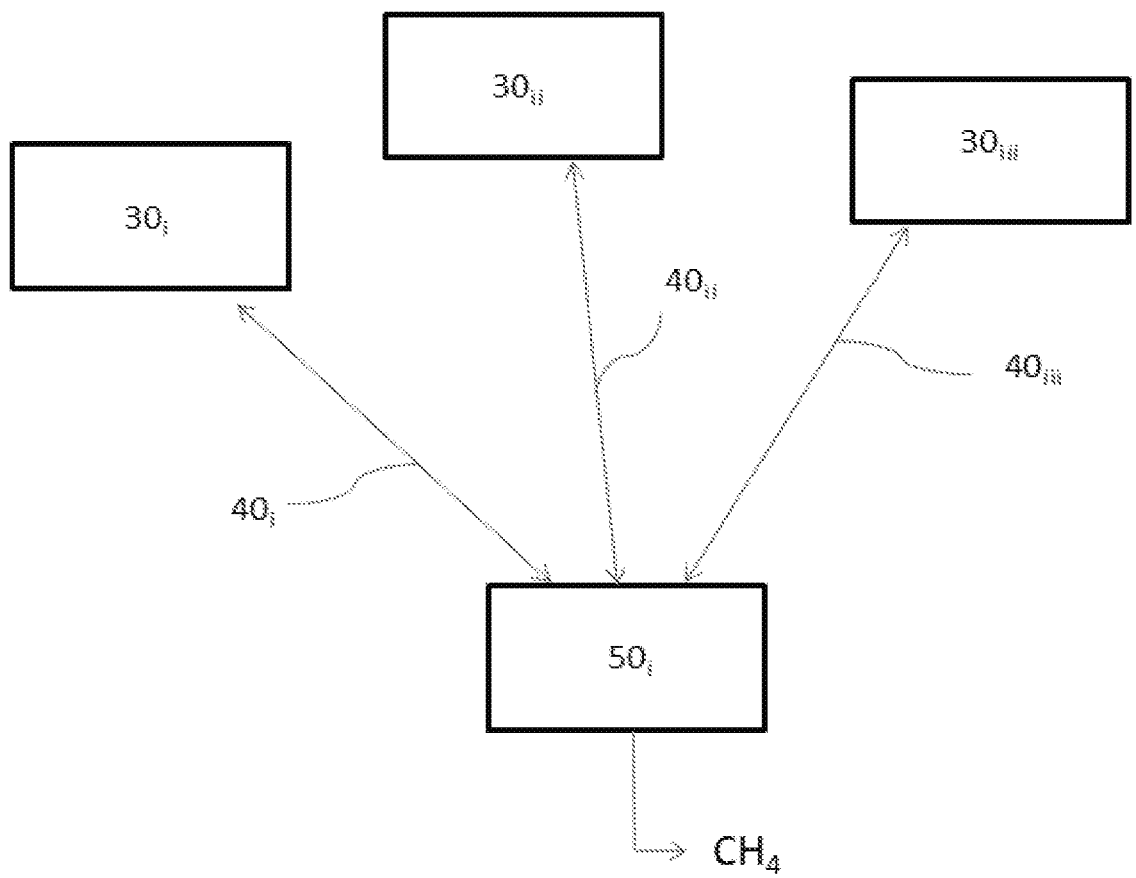
FIG. 2 is a flow diagram of a method according to one embodiment of the invention.

Referring to FIG. 2, the steps of obtaining raw biogas 10 and partially purifying the raw biogas 20, collectively represented as 30, are performed at a plurality of pre-processing sites $30_i$, $30_{ii}$, $30_{iii}$. The partially purified biogas obtained at each pre-processing site is collected and/or transported via a collection system (e.g., $40_i$, $40_{ii}$, and/or $40_{iii}$) to the centralized biogas upgrading facility $50_i$, where it is upgraded to provide RNG. Advantageously, this hub-and-spoke configuration improves efficiency.

Biogas Production

In general, the raw biogas obtained in 10 and/or at each pre-processing site $30_i$, $30_{ii}$, $30_{iii}$ can be obtained from any source that produces biogas (e.g., a landfill or anaerobic digester). For example, the biogas may be obtained from a landfill and/or from a biogas plant that includes one or more anaerobic digesters. In embodiments where the biogas is obtained from a biogas plant that includes one or more anaerobic digesters, the digesters may be connected in series and/or in parallel, may be single-stage or multi-stage digestion systems, and/or may be designed and/or operated in a number of configurations including batch or continuous, mesophilic or thermophilic temperature ranges, and low, medium, or high rates. In addition, in embodiments where the biogas is obtained from a biogas plant that includes one or more anaerobic digesters, the digesters may be used for manure or other farm waste, for wastewater treatment, for treating industrial waste, and/or for treating wastewater, wastes, and/or residues from an ethanol process. In one embodiment, the biogas is sourced from one or more anaerobic digesters at a dairy farm. In one embodiment, the biogas is sourced from one or more anaerobic digesters at a swine farm. In one embodiment, the biogas is sourced from a landfill site. In one embodiment, the biogas is sourced from a wastewater treatment plant (WWTP).

Raw biogas may, for example, have a methane ($CH_4$) content between about 35% and 75% (e.g., average of about 60%) and a carbon dioxide ($CO_2$) content between about 15% and 65% (e.g., average of about 35%), depending on the source. For example, without being limiting, biogas plants based on anaerobic digesters fed agricultural waste may have a methane content between about 50% and 75%, whereas biogas from a landfill site may have a methane content between about 25% and 65%. In one embodiment, the raw biogas has a methane content between about 25% and 75% and a carbon dioxide content between about 15% and 65%, and the carbon dioxide and methane make up at least 75% of the biogas by volume.

In general, each source of biogas may produce biogas at any rate. For example, one source of biogas may be a landfill that generates biogas at a rate between 3000 and 6000 SCFM (standard cubic feet per minute), whereas another source of biogas may be an anaerobic digestion (AD) facility that produces less than 1000 SCFM of biogas. In one embodiment the biogas source (e.g., based on landfill or anaerobic digester) produces raw biogas at a rate less than 6000 SCFM (standard cubic feet per minute). In one embodiment the biogas source produces raw biogas at a rate less than 5000 SCFM. In one embodiment the biogas source produces raw biogas at a rate between 100 and 3000 SCFM. In one embodiment the biogas source produces raw biogas at a rate between 1000 and 3000 SCFM. In one embodiment the biogas source produces raw biogas at a rate between 1500 and 3000 SCFM.

The percentages used to quantify gas composition and/or a specific gas content, as used herein, are expressed as mol %, unless otherwise specified.

Partial Purification

In general, the partial purification in 20 and/or at each pre-processing site $30_i$, $30_{ii}$, $30_{iii}$ will remove $H_2O$, $H_2S$, and/or $CO_2$ from the raw biogas to provide partially purified biogas having an $H_2O$ content, $H_2S$ content, and/or $CO_2$ content that is less than that of the raw biogas. Optionally, one or more other non-methane components are removed.

In general, the partial purification provided in 20 and/or at each pre-processing site $30i$, $30_{ii}$, $30_{iii}$ does not produce a gas that meets applicable quality specifications for injection into the natural gas distribution system (e.g., pipeline standards) and/or is suitable for use in the transportation sector, but rather, requires further purification (e.g., in order to qualify as RNG under applicable regulations). For example, in one embodiment, the partially purified biogas has a non-methane content that is at least 20%. In one embodiment, the partially purified biogas has a non-methane content that is at least 15%. In one embodiment, the partially purified biogas has a non-methane content that is at least 10%. In one embodiment, the partially purified biogas has a non-methane content that is at least 8%. In one embodiment, the partially purified biogas has an inert content (e.g., $CO_2$, $N_2$, helium, argon, neon) that is greater than 10%.

In one embodiment, the partially purified biogas has a $CO_2$ content less than 10%, less than 9%, less than 8%, less than 7%, less than 6%, or less than 5%. In one embodiment, the partially purified biogas has a $CO_2$ content between about 4% and 8%, between about 4% and 9%, or between about 4% and 10%. In one embodiment, the partially purified biogas has a $CH_4$ content between about 50% and about 93%. In one embodiment, the partially purified biogas has a $CH_4$ content between about 50% and about 90% and a $N_2$ content between about 10% and 20%. In one embodiment, the partially purified biogas has a $CH_4$ content between about 80% and about 90% and an $N_2$ content between about 10% and 20%. In one embodiment, the partially purified biogas has a $CH_4$ content between about 72% and about 90%, a $CO_2$ content between about 0 and 8%, and an $N_2$ content between about 5% and 20%. In one embodiment, the partially purified biogas has a combined $CH_4$ and $N_2$ content that is greater than 98%, where the $N_2$ content is at least 5%. In one embodiment, the partially purified biogas has a combined $CH_4$ and $N_2$ content that is greater than 98%, and a $CO_2$ content that is less than 1%. In one embodiment, the partially purified biogas has a combined $CH_4$ and $N_2$ content that is greater than 98%, where the $N_2$ content is at least 5%, and wherein the $CO_2$ content is less than 200, 100, 50, or 30 ppm.

In one embodiment, the partial purification of the raw biogas is provided near the source of raw biogas (e.g., at a pre-processing site). For example, in one embodiment a pre-processing site is fed raw biogas directly from a biogas source and/or is located at a biogas plant or landfill. In one embodiment, the pre-processing site is fed raw biogas from a biogas pipeline fed from one or more biogas sources. The term "pipeline", as used herein, refers to a single pipe or an interconnected network of pipes (e.g., physically connected), including any associated pumps and valves.

In one embodiment, the partial purification of the raw biogas is provided using a stationary purification system (e.g., installed at the pre-processing site). Using a stationary purification system advantageously allows the partial purification system to be readily available on-site to at least partially purify the raw biogas as it is produced. Moreover, since the purification system is stationary it can be designed and/or selected in dependence upon the average composition the raw biogas from that particular source. Furthermore, since the purification system remains on-site (e.g., is not transported with the vessels) more partially purified biogas may be transported. For purposes herein, the term "stationary" as used with reference to a purification system, refers to the purification system not moving from the pre-processing site or facility at which it is used (although it may move within the pre-processing site or facility).

In one embodiment, at least part of the partial purification is achieved using a stationary purification system based on any suitable method/technology, or combination of methods/technologies, in one or more stages, as known in the art. For example, $H_2O$ may be removed using a standard biogas dehumidifier, whereas $H_2S$ may be removed using a commercial $H_2S$ removal unit (e.g., based on activated carbon, molecular sieve, iron sponge, water scrubbing, NaOH washing, and/or biofilter or biotrickling filter technologies). Some $H_2S$ may also be removed during the water removal step, if present. $O_2$ may be removed by catalytic oxidation, membranes, or low pressure PSA. $CO_2$ may be removed by absorption (e.g., water scrubbing, organic physical scrubbing, chemical scrubbing), pressure swing adsorption (PSA), membrane permeation, and/or cryogenic upgrading. In one embodiment, the partial purification system includes a dehumidifier, a scrubber, a membrane unit, a solvent extraction unit, a pressure swing adsorption unit, and/or a cryogenic unit.

In one embodiment, the partial purification is essentially a cleaning or pre-cleaning stage that does not significantly remove $CO_2$ or $N_2$. For example, in one embodiment, the partial purification removes $H_2O$ and/or $H_2S$, but does not significantly remove $CO_2$ or $N_2$.

In one embodiment, the partial purification removes $H_2O$. Raw biogas may be fully saturated with water vapour and/or may have a water content of about 7% (at 40° C.). Removing $H_2O$ is advantageous since moisture can condense into water or ice when passing from high to low pressure systems, which may cause corrosion, may result in clogging, and/or may interfere with gas flow and pressure measurements (e.g., causing system control problems). In addition, the presence of water may cause hydrates to form. In one embodiment, the partial purification removes more than 90%, 92%, 94%, 96%, or 98% of the $H_2O$ present in the raw biogas. In one embodiment, the partial purification removes more than 99% of the $H_2O$ present in the raw biogas. In one embodiment, the partial purification removes sufficient $H_2O$ from the raw biogas that the $H_2O$ content of partially purified biogas more than meets the $H_2O$ content specifications for RNG. In one embodiment, the partial purification 20 does not remove $H_2O$. In one embodiment, the partial purification 20 removes sufficient moisture to provide the partially purified biogas with a $H_2O$ concentration less than 0.4 g/m$^3$ of biogas. In one embodiment, the partial purification 20 removes sufficient moisture to provide the partially purified biogas with a $H_2O$ concentration less than 0.2 g/m$^3$ of biogas. In one embodiment, the partial purification includes a $H_2O$ removal stage that uses refrigeration techniques or desiccant drying. In one embodiment, the partial purification includes multi-stages of $H_2O$ removal (e.g., first stage of $H_2O$ removal followed by a second stage of $H_2O$ removal), which may or may not be consecutive.

In one embodiment, the partial purification removes $H_2S$. Raw biogas may have an $H_2S$ concentration between about 0 and about 6700 ppm(v) (e.g., 0-10,000 mg/m$^3$). For example, without being limiting, biogas derived from agricultural waste may have an $H_2S$ concentration between 0-4000 ppm(v), whereas biogas from a landfill may have an $H_2S$ concentration between 0 and 1000 ppm(v). $H_2S$ is both poisonous and corrosive, and can damage piping, equipment, and instrumentation. $H_2S$ can be reactive with many metals, and the reactivity can be higher at higher concentration and pressure, and/or in the presence of water. In one embodiment, the partial purification removes more than 90%, 92%, 94%, 96%, or 98% of the $H_2S$ present in the raw biogas. In one embodiment, the partial purification removes more than 99% of the $H_2S$ present in the raw biogas. In one embodiment, the partial purification removes sufficient $H_2S$ from the raw biogas that the $H_2S$ content of partially purified biogas more than meets the $H_2S$ content specifications for RNG. In one embodiment, the partial purification removes sufficient $H_2S$ from the raw biogas that the $H_2S$ content of partially purified biogas is safer to transport but requires additional $H_2S$ removal to meet RNG standards. In one embodiment, the partial purification 20 does not remove $H_2S$. In one embodiment, the partial purification removes sufficient $H_2S$ from the raw biogas that the $H_2S$ concentration of partially purified biogas is less than 200 ppm(v). In one embodiment, the partial purification removes sufficient $H_2S$ from the raw biogas that the $H_2S$ concentration of partially purified biogas is less than 100 ppm(v). In one embodiment, the partial purification removes sufficient $H_2S$ from the raw biogas that the $H_2S$ concentration of partially purified biogas is between 20 ppm(v) and 50 ppm(v). In one embodiment, the partial purification removes sufficient $H_2S$ from the raw biogas that the $H_2S$ concentration of partially purified biogas is less than 50, 40, 30, 20, or 10 ppm(v). In one embodiment, the partial purification removes sufficient $H_2S$ from the raw biogas that the $H_2S$ concentration of partially purified biogas is less than about 6 ppm(v). In one embodiment, the partial purification includes a first stage of $H_2S$ removal (e.g., biological) followed by second stage of $H_2S$ removal (e.g., an adsorption bed), which may or may not be consecutive.

In one embodiment, the partial purification removes $H_2O$ and $H_2S$. Contaminants such as $O_2$, $NH_3$, VOCs, siloxanes, and/or particulates are optionally removed, although this is not necessary. Although the biogas upgrading system used in 50 may include $H_2O$ and/or $H_2S$ removal, it can be advantageous to remove $H_2O$ and/or $H_2S$ prior to collection and/or transport. For example, transporting gas with $H_2S$ creates the risk that in the event of a leak or accident, $H_2S$ leaks out, thereby creating toxic gas and safety issues. This risk is eliminated or reduced when the partial purification includes $H_2S$ removal. In addition, since $H_2S$, and in particular the combination of $H_2O$ and $H_2S$, can cause corrosion problems, removing the $H_2O$ and/or $H_2S$ can reduce equipment maintenance costs, and provide flexibility on construction materials for mobile storage tanks. Furthermore, removing $H_2S$ may improve the $CO_2/CH_4$ separation if present during the partial purification.

In one embodiment, the partial purification 20 removes $O_2$. Removing $O_2$ may be particularly advantageous prior to compression and transport.

In one embodiment, the partial purification 20 removes $CO_2$. In one embodiment, the partial purification removes $CO_2$ and/or $N_2$. Contaminants such as $H_2O$, $H_2S$, $O_2$, $NH_3$, VOCs, siloxanes, and/or particulates are optionally removed. For example, some $CO_2$ removal technologies also remove $H_2S$. Although the biogas upgrading system used in 50 will typically include $CO_2$ and/or $N_2$ removal, it can be advantageous to remove $CO_2$ prior to collecting and/or transporting the partially purified biogas. Even removing half of the $CO_2$ present in biogas can significantly reduce the amount of gas that needs to be compressed and/or transported.

With specific regard to the advantages of $CO_2$ removal, consider the following. For every quantity of biogas compressed and transported, a certain amount of equipment and energy is required. This equipment and/or energy are associated with additional cost and greenhouse gas (GHG) emissions. Since raw biogas can contain about 60% $CO_2$, removing $CO_2$ from raw biogas can significantly reduce the amount of gas processed, and thus reduce the compression and/or transportation cost per unit of energy delivered (i.e., which is related to the amount of methane). For example, removing a significant quantity of $CO_2$ can decrease the number of trucks and/or runs required. Accordingly, transporting partially purified biogas, particularly when $CO_2$ has been removed, is generally more efficient (e.g., in terms of both costs and GHG emission reductions) than transporting raw biogas.

In addition, the $CO_2$ in raw biogas can make it more challenging (e.g., there can be phase change issues when $CO_2$ is compressed or depressurized) and/or less energy efficient to compress relative to pure $CH_4$. Accordingly, removing even a portion of the $CO_2$ from raw biogas can improve compression and/or transport to the centralized biogas upgrading facility, by simplifying compressing and reducing compressions costs (e.g., relative to compressing raw biogas).

In one embodiment, the partial purification removes more than 90%, 92%, 94%, 96%, or 98% of the $CO_2$ present in the raw biogas. In one embodiment, the partial purification removes more than 20%, 30%, 40% or 50% of the $CO_2$ present in the raw biogas. In one embodiment, the partial purification removes between about 5% and 20% of the $CO_2$ present in the raw biogas. In one embodiment, the partial purification removes less than 5% of the $CO_2$ present in the raw biogas. In one embodiment, the partial purification does not substantially remove $CO_2$.

In one embodiment, the partial purification removes sufficient $CO_2$ to increase the heating value of the biogas by at least 50 BTU/scf, at least 100 BTU/scf, at least 150 BTU/scf, at least 200 BTU/scf, or at least 250 BTU/scf. For example, in one embodiment, the partial purification increases the heating value of the biogas (e.g., which may be about 350-500 BTU/scf) to at least 600 BTU/scf, at least 700 BTU/scf, or at least 800 BTU/scf, but retains sufficient $CO_2$ and/or $N_2$ such that the heating value does not exceed 900 BTU/scf, 925 BTU/scf, or 950 BTU/scf. The term "heating value", as used herein, refers to the higher heating value (HHV), unless otherwise specified.

In one embodiment, the partial purification removes sufficient $CO_2$ from the raw biogas such that the $CO_2$ content of partially purified biogas is less than 25%. In one embodiment, the partial purification removes sufficient $CO_2$ from the raw biogas such that the $CO_2$ content of partially purified biogas is less than 20%, 15%, 10%, or 8%. In one embodiment, the partial purification removes sufficient $CO_2$ from the raw biogas such that the $CO_2$ content of partially purified biogas is less than 5%. In one embodiment, the partial purification removes sufficient $CO_2$ from the raw biogas such that the $CO_2$ content of partially purified biogas is less than 4%.

In one embodiment, between 10% and 85% of the $CO_2$ is removed. In one embodiment, between 20% and 80% of the $CO_2$ is removed. In one embodiment, between 40% and 60% of the $CO_2$ is removed. In one embodiment, between 84% and 90% of the $CO_2$ is removed. In one embodiment, the partial purification system used removes more than 10% and less than 95% of the $CO_2$ in the biogas. For example, removing 10% of the $CO_2$ from a biogas containing 50% $CH_4$, 38% $CO_2$, 10% $N_2$, and 2% $O_2$, provides a partially purified biogas containing 52% $CH_4$, 35.6% $CO_2$, 10.4% $N_2$, and 2.1% $O_2$, whereas removing 85% of the $CO_2$ from the biogas containing 50% $CH_4$, 38% $CO_2$, 10% $N_2$, and 2% $O_2$, provides a partially purified biogas containing 73.9% $CH_4$, 8.4% $CO_2$, 14.8% $N_2$, and 3% $O_2$. Removing only enough $CO_2$ to yield a partially purified biogas having a $CH_4$ content that is less than 85% is advantageous in that such upgrading is relatively easy and/or can be achieved using commercial systems that are less costly. In one embodiment, sufficient $CO_2$ is removed so as to provide the partially purified biogas with a $CH_4$ content that is at least 70% and no more than 90%, which may provide a good balance between upgrading cost and compressibility.

In this embodiment, the relative high pressures required for transport are used to improve the partial purification. In one embodiment, the partial purification includes a water based removal of $CO_2$.

Although it can be advantageous to remove $CO_2$, $H_2O$, and/or $H_2S$ from raw biogas prior to collection and/or transport, doing so has the potential to increase capital investment and/or operating costs (e.g., for the biogas producer or another party), while potentially introducing a redundant step. Nevertheless, this approach offers some unique benefits.

One advantage is that since the partial purification can yield a partially purified biogas having a non-methane content that is greater than 10%, while still being effective for its purpose, a relatively simple and/or inexpensive partial purification module or system can be used. Such systems may have a relatively low capital investment, operating costs, associated maintenance, space requirements, and/or appear more user-friendly. For example, a water scrubber system or a relatively simple membrane system (e.g., single stage and/or low permaselectivity for $CO_2/CH_4$ separations) are relatively affordable for small scale use, and are particularly suitable for partial purification of raw biogas prior to transport to a centralized biogas upgrading facility. Accordingly, the purification of the biogas may be conducted into two stages. The first stage, which provides a crude purification, is provided using relatively simple and/or inexpensive equipment. The second stage, which provides a more rigorous purification and is more challenging technically, can be conducted at the biogas upgrading facility. In this case, the more difficult second stage of purification still benefits from the economies of scale.

In addition, although providing partial purification prior to collection and transport increases capital investment costs (by forsaking the economies of scale of centralized processing for a portion of the purification, with multiple smaller partial purification systems instead of a centralized facility), the aggregate cost of transporting can be reduced by permitting lower cost materials of construction or by reducing the bulk quantity that needs to be transported.

Another advantage is that since the partial purification can focus on removing fewer components (e.g., $H_2O$, $H_2S$, and/or $CO_2$), these components may be removed using a stationary system that can remove them more efficiently and/or cost effectively than a mob biogas upgrading or purification system. For example, removing $H_2S$ at the pre-processing site with a dedicated $H_2S$ removal system can be advantageously efficient. Moreover, it facilitates transport of the biogas at $H_2S$ levels that meet transportation standards.

Another advantage is that with some types of biogas upgrading technologies, such as simple membrane systems, there typically is a trade-off between the recovery of a component and its purity. For example, when using a simple membrane system to separate $CH_4$ and $CO_2$, high $CH_4$ yields are typically associated with a relatively large $CO_2$ content. Alternatively, if relatively pure $CH_4$ is to be recovered (e.g., with little $CO_2$), the $CH_4$ yield will be lower since some of the $CH_4$ will be lost in the off-gas with the $CO_2$. In conventional biogas upgrading, the goal is to obtain relatively pure $CH_4$, and thus a significant amount of the $CH_4$ can be lost as methane "slip". However, when providing partial purification prior to transport to a centralized biogas upgrading facility, the goal can be to maximize the amount of $CH_4$ transported to the centralized biogas upgrading facility, while removing only some of the $CO_2$. Accordingly, in this configuration, the trade-off is an advantage and/or facilitates the use of less expensive equipment.

Yet another advantage is that providing partial purification at or near the source of raw biogas (e.g., a biogas plant) can provide additional value-added products and/or facilitate recycling of the removed components. For example, if water is removed, it can be recycled within the biogas plant. In embodiments where the partial purification includes removing $CO_2$, the removed $CO_2$ can be recycled within the biogas plant (e.g., injected into an anaerobic digester, fed to a greenhouse, etc.) or can be provided as a value added product.

Notably, in types of biogas upgrading technologies where there is a trade-off between the recovery of a component and its purity, such as simple membrane systems, when the purity of the product (e.g., $CH_4$) is low, the purity of the removed product (e.g., $CO_2$) is often high. Accordingly, the off-gas of the partial purification system may be sufficiently clean for direct discharge to the atmosphere (e.g., the $CO_2$ removed from the raw biogas is biogenic). Another advantage is that, with some types of biogas upgrading technologies, such as membrane systems, some methane may be lost in an off-gas (e.g., methane slip). In this case, the methane in the off-gas can be combusted to provide energy for the compression.

In one embodiment, the partially purified biogas is stored prior to collection and transport (e.g., at the pre-processing site). The partially purified biogas can be stored using any suitable storage system (e.g., including any vessel). For example, the partially purified biogas can be stored in a storage system that includes permanent storage tanks and/or mobile storage tanks.

In one embodiment, the partially purified biogas is stored in one or more mobile storage tanks (e.g., a batch container that can contain gas and that can be moved from one location to another). For example, in one embodiment, the partially purified biogas is fed into one or more cylinders mounted to or within a trailer, skid, or shipping container that is attachable and detachable from a truck (e.g., a tractor unit). Some examples of systems that include one or more mobile storage tanks are tube trailers and cylinder trailers.

In one embodiment, the partially purified biogas is fed in one or more mobile storage tanks as it is produced (e.g., as the partially purified biogas is produced, it is fed to the one or more mobile storage tanks where it accumulates). The one or more mobile storage tanks may be arranged to fill in tandem or parallel. For example, in one embodiment, partially purified biogas is fed to a single trailer until the trailer is at capacity before the partially purified biogas is fed to another trailer. In one embodiment, partially purified biogas is simultaneously fed to a plurality of trailers. Feeding the partially purified biogas to a plurality of trailers is advantageous in that the fill rate may be lower. A lower fill rate may allow more time for the heat generated from the compression to dissipate and/or may increase the duration between collection times.

In one embodiment, the partially purified biogas is compressed before being fed into one or more mobile storage tanks (e.g., each mobile storage tank may include one or more pressure vessels). In this embodiment, the pre-processing site may include one or more compressors (e.g., where each compressor may be a multistage compressor). In one embodiment, the pre-processing site includes a standard CNG compressor. In one embodiment, the pre-processing site includes a 3-stage non-lubricated compressor configured to compress partially purified biogas prior to being fed to the one or more mobile storage tanks.

In many instances, the raw biogas obtained in 10 will be obtained at pressures less than 10 psi (e.g., 2-3 psi). Depending on the system and/or technology used for the partial purification, the pressure of the partially purified biogas produced in 20 may be at a higher pressure (e.g., about 200 psig for a membrane separation). It can be particularly advantageous to compress the partially purified biogas to pressures above 1500 psig for storage in a mobile storage tank, as many trailers are designed to transport high-pressure gas (e.g., about 2000-3600 psig), and thus this increases the amount of methane per tank. In one embodiment, the partially purified biogas is compressed to above 1000 psig. In one embodiment, the partially purified biogas is compressed to above 1500 psig. In one embodiment, the partially purified biogas is compressed to above 2000 psig. In one embodiment, the partially purified biogas is compressed to between 2000 psig and 4500 psig. In one embodiment, the partially purified biogas is compressed to between 2400 psig and 4000 psig. In one embodiment, the partially purified biogas is compressed to between 2800 psi and 4200 psig. In one embodiment, the partially purified biogas is compressed to between 3400 psig and 3600 psig. In one embodiment, the partially purified biogas is compressed to about 3500 psig. In one embodiment, the partially purified biogas is compressed to about 3000 psig.

Filling one or more mobile storage tanks with compressed partially purified biogas as the partially purified biogas is produced is advantageous in that it may obviate the need for buffer storage, may obviate transferring the biogas gas between storage tanks (e.g., which may involve compression and/or decompression), and will generally be more efficient in terms of collecting the partially purified biogas for transport back to the centralized biogas upgrading facility. For example, once a mobile storage tank is at the desired fill level (e.g., at capacity), the entire tank can be collected (e.g., picked-up) and/or transported to the centralized biogas upgrading facility. For example, if the mobile storage tank is part of a truck, the truck may be directed to the centralized biogas upgrading facility. If the mobile storage tank is mounted to or mounted within a skid, trailer or shipping container, the skid, trailer or shipping container may be loaded directly onto or otherwise coupled to the mode of transportation (e.g., a vehicle such as a truck, ship, rail car) for transport to the centralized biogas upgrading facility. For example, a tube trailer can be temporarily parked at the pre-processing site until it is filled and/or collection is arranged, at which point it is detachably coupled to the truck tractor, and transported to the centralized biogas upgrading facility.

In one embodiment, compressed partially purified biogas is fed into one or more trailers (i.e., having mobile storage tanks) that are temporarily parked at the pre-processing site. Once the trailers are filled to the desired level, which may for example take between 1.5 and 3 hours, they may be coupled to a truck (e.g., the same truck or different trucks) and transported to the centralized biogas upgrading facility.

In one embodiment, compressed partially purified biogas is fed into one or more trucks (i.e., having mobile storage tanks) that are temporarily parked at the pre-processing site. Once the trucks are filled substantially to full capacity or otherwise to the desired level, which may, for example, take several hours (e.g., about 1.5 to about 3 hours), they may be transported directly to the centralized biogas upgrading facility. Optionally, the mobile storage tanks are removably connected to the trucks.

Transporting the Partially Purified Biogas

In general, the partially purified biogas may be collected (e.g., picked-up) and transported (e.g., to the centralized biogas upgrading facility). In one embodiment, the collection of partially purified biogas includes transporting the partially purified biogas at least some distance by truck, rail, or ship. In one embodiment, the transport includes moving a vessel containing the partially purified biogas by truck, rail, and/or ship at least one mile. In one embodiment, the transport includes a combination of transporting the partially purified biogas in a vessel and transporting the partially purified biogas via pipeline. Transporting the partially purified biogas as a compressed gas (e.g., at 3600 psi) is advantageous in that it increases the amount of methane delivered per tank.

In one embodiment, where the partially purified biogas is fed in one or more mobile storage tanks at the pre-processing site, once the mobile storage tanks(s) have reached a certain fill level (e.g., based on pressure or density), or a pick-up is arranged, the mobile storage tanks are transported via a truck, rail, and/or ship. For example, in one embodiment, the one or more mobile storage tanks are mounted in a shipping container that can be loaded onto a truck bed or trailer bed for transport. In one embodiment, the one or more mobile storage tanks are mounted to a trailer that can be coupled to a truck (e.g., a towing truck, a tractor unit, a leading trailer, or some prime moving vehicle) for transport.

In one embodiment, a trailer including one or more mobile storage tanks containing high pressure (e.g., 3000 psi) partially purified biogas is collected from the pre-processing site, and is then transported to the centralized biogas upgrading facility. A trailer containing one or more empty mobile storage tanks (e.g., under 200 psi) is then transported back to the pre-processing site, or another pre-processing site, for exchange with a trailer containing one or more mobile storage tanks containing high pressure, partially purified biogas.

In one embodiment, a single truck is provided to transport mobile storage tanks containing partially purified biogas directly to the biogas upgrading facility (e.g., direct route). In one embodiment, a plurality of trucks is provided to transport mobile storage tanks containing partially purified biogas directly to the biogas upgrading facility (e.g., direct route). In one embodiment, a plurality of trucks (e.g., tractor units) are provided to transport trailers or shipping containers containing the partially purified biogas between a plurality of pre-processing sites and the biogas upgrading facility. In one embodiment, a plurality of trailers containing partially purified biogas is transported by one truck (i.e., a double or triple trailer configuration). In one embodiment, the trucks are fueled by compressed natural gas (CNG). In general, the number of mobile storage tanks (e.g., trailers) temporarily associated with a pre-preprocessing site will depend on the production rate of raw biogas and/or the distance of the pre-processing site from the biogas upgrading facility.

Collecting or arranging for the collection of partially purified biogas from one or more pre-processing sites advantageously can exploit the use of stationary partial purification units and mobile storage tanks. Accordingly, the process/system is more efficient. For example, since the partially purified biogas is produced by a stationary partial purification unit, collection (e.g., pick-up) of the partially purified biogas can be more expedient as most or all of the partially purified biogas can be produced before the pick-up. Even in embodiments where the partially purified biogas is generated during pick-up, the use of the stationary partial purification unit is advantageous. For example, the use of a stationary partial purification unit can allow the raw biogas to be at least partially purified using a unit customized for the quantity and quality of raw biogas provided at the corresponding pre-processing site. Moreover, it can efficiently remove toxic gases from the raw biogas (e.g., $H_2S$) so that the biogas collection system does not have to address transportation concerns related to the same.

Once transported, the partially purified biogas can be decompressed and removed from the mobile storage tank(s). For example, in one embodiment, a centralized decompression unit is provided on a manifold that receives partially purified biogas from different mobile storage tanks. Advantageously, transporting the partially purified biogas in mobile storage tanks may obviate the need for dedicated buffer storage at the biogas upgrading facility. For example, since the partially purified biogas is transported in mobile storage tanks, the partially purified biogas can be stored therein until required. Moreover, since the partially purified biogas may be transported at high pressure, this higher pressure may be exploited during the biogas upgrading process.

In some cases, challenges may arise when the partially purified biogas contains a significant amount of $CO_2$ and/or is stored at high pressure. For example, there may be issues with freezing of the lines as $CO_2$ gas could form dry ice upon depressurization. In one embodiment, problems associated with $CO_2$ freezing are minimized or avoided by using the heat generated during compression for filling the mobile pressure tank to maintain the partially stored biogas at an increased temperature so that, upon expansion, it does not freeze. Advantageously, this also reduces the amount of energy required to cool the gas after it is compressed. In another embodiment, problems associated with $CO_2$ freezing are addressed by heating the compressed gas before it is depressurized (e.g., at the receiving end). Advantageously, this allows more partially purified biogas to be stored. In another embodiment, problems associated with $CO_2$ freezing are addressed by displacing the partially purified gas by feeding an alternate fluid into the vessels that has less propensity to freeze. In one embodiment, this fluid is a cleaner gas (e.g. relatively pure methane). In one embodiment, the fluid is a liquid, which pushes the partially purified biogas out to another location. In one embodiment, the partially purified gas is displaced using a positive displacement process (e.g., a piston type of mechanism).

Biogas Upgrading

In general, the partially purified biogas transported to the centralized biogas upgrading facility will be further purified 50 (e.g., to produce RNG) using any suitable biogas upgrading system and/or technology. The RNG can be used as a substitute for fossil natural gas, can be injected into the natural gas grid, and/or can be used as a transportation fuel.

For purposes herein, the term "renewable natural gas" or "RNG" refers to biogas that has been upgraded to meet or exceed applicable natural gas pipeline quality standards and/or specifications, meet or exceed applicable quality specifications for vehicle use (e.g., CNG specifications), and/or that qualifies as RNG under applicable regulations. Pipeline specifications include specifications required for the biogas for injection into a natural gas commercial distribution system. Pipeline quality standards or specifications may vary by region and/or country in terms of value and units. For example, pipelines standards may require a $CH_4$ level that is greater than 95%. In addition, or alternatively, the natural gas pipeline standards may refer to the purity of the gas expressed as a heating value (e.g., in British Thermal Units (BTU)/standard cubic foot). Pipeline standards may require, for example, that the heating value of RNG be greater than about 950 BTU/scf, greater than about 960 BTU/scf, or greater than about 967 BTU/scf. In the United States (US), RNG and CNG standards may vary across the country. For example, for one company, the pipeline specifications may require a heating value between 967 and 1110 BTU/scf, a $CO_2$ content less than 1.25%, an $O_2$ content less than 0.02%, a total inert content (e.g., $CO_2$, $N_2$, helium, argon, neon) less than 4%, a $H_2S$ concentration less than 0.25 gr/100 scf of gas, and a water concentration less than 7 lbs/MMscf. Whereas for another company, the pipeline specifications may require a heating value greater than 970 BTU/scf, a $CO_2$ content less than 1.4%, an $O_2$ concentration less than 10 ppm, a $N_2$ content less than 1.2%, and $H_2S$ concentration less than 1 ppm. The specifications for CNG for vehicle use may include a heating value between 940-1100 BTU/scf, a $CO_2+N_2$ content less than about 4%, an $O_2$ content less than 1%, and a $H_2S$ content less than 6 ppm(v). In one embodiment, the RNG produced has a methane content greater than 95%. In one embodiment, the RNG produced has a heating value greater than 950 BTU/scf.

In general, the further purification provided in 50 will remove $CO_2$, $N_2$, $H_2O$, $H_2S$, $O_2$, $NH_3$, VOCs, siloxanes, and/or particulates from the partially purified biogas to provide RNG having a $CO_2$, $N_2$, $H_2O$, $H_2S$, $O_2$, $NH_3$, VOCs, and/or siloxane content that is less than the partially purified biogas.

The centralized biogas upgrading facility may be an independent facility or may be integrated with a biogas production plant. For example, in one embodiment, the centralized biogas upgrading facility is located at or near a landfill site. Advantageously, this configuration can provide higher quality RNG at a reduced capital cost (e.g., relative to a plurality of biogas upgrading facilities). Moreover, since there are higher volumes fed into the centralized biogas upgrading facility (e.g., it receives raw biogas and/or partially purified biogas from a plurality of sources), the biogas upgrading benefits from the economies of scale (e.g., the capital cost of biogas upgrading systems are subject to economies of scale, where smaller plants are less capital efficient than larger plants).

In one embodiment, the centralized biogas upgrading facility receives biogas (e.g., raw and/or partially purified) at a rate greater than 4000 SCFM (standard cubic feet per minute). In one embodiment the centralized biogas upgrading facility receives biogas at a rate greater than 6,000 SCFM. In one embodiment the centralized biogas upgrading facility receives biogas at a rate greater than 8,000 SCFM. In one embodiment the centralized biogas upgrading facility receives biogas at a rate greater than 10,000 SCFM. In one embodiment the centralized biogas upgrading facility receives biogas at a rate greater than 15,000 SCFM. In one embodiment the centralized biogas upgrading facility receives biogas at a rate between 10,000 and 20,000 SCFM.

In one embodiment, the centralized biogas upgrading facility is a stand-alone facility located near a natural gas pipeline, and receives partially purified biogas transported from one or more biogas sources (e.g., landfill or anaerobic digester).

The centralized biogas upgrading facility may provide one or more units and/or stages that remove $CO_2$, $N_2$, $H_2O$, $H_2S$, $O_2$, $NH_3$, VOCs, siloxanes, and/or particulates. These non-methane components may be removed by any combination of chemical and/or physical technologies, in one or more stages. For example, one stage may remove more than one non-methane component. The removal of $H_2O$, $H_2S$, $O_2$, $NH_3$, VOCs, siloxanes, and/or particulates may be referred to as biogas cleaning.

Water ($H_2O$) may be removed from the biogas by cooling, compression, absorption, adsorption, and/or coalescing filtration. For example, water may be removed by increasing the pressure or decreasing the temperature in order to cause the water to condense so that it may be removed. Alternatively, water may be removed by adsorption using silicon dioxide ($SiO_2$), activated carbon, or molecular sieves (e.g., pressure swing adsorption).

Hydrogen sulfide ($H_2S$) may be removed from the biogas by adsorption on activated carbon (e.g., impregnated activated carbon such as ZnO impregnated carbon), adsorption on molecular sieve, adsorption using iron oxides (e.g., iron oxide impregnated wood chips (iron sponge)), iron oxide pellets, or proprietary iron-oxide media, physical absorption (e.g., water scrubbing), chemical absorption (e.g., NaOH washing), and/or biofilters or biotrickling filters (e.g., where the biogas is forced through a moist, packed bed that contains microorganisms). Some $H_2S$ may also be removed during the water removal step, if present.

Siloxanes may be removed from the biogas by filtration (e.g., activated alumina, activated carbon, graphite filtration, or silica gels, which absorb siloxanes from biogas), by condensation or cryogenic techniques, using synthetic resins, using liquid absorbents (e.g., Selexol™), using membranes, and/or using biological processes.

Particulates (e.g., dust and/or dirt) may be removed by mechanical filters, centrifugal separation, screens, etc. In one embodiment, particulates are removed by a coarse particulate filter (e.g., 25 microns).

Nitrogen ($N_2$) may be removed from the biogas by pressure swing absorption (PSA), membranes, and/or cryogenic systems. Oxygen ($O_2$) may be removed by catalytic oxidation, membranes, or low pressure PSA. While $N_2$ and $O_2$ are not typically found in high concentrations in agricultural and/or farm based biogas, they, and in particular $N_2$, may be present in higher concentrations in biogas produced at landfills. For example, biogas derived from agricultural waste may have an $N_2$ content between 0%-1% and an $O_2$ content between 0 and 0.5%, whereas biogas from landfills may have an $N_2$ content between 0% and 20% and an $O_2$ content between 0% and 5%. Carbon dioxide ($CO_2$) can be removed from biogas by absorption (e.g., water scrubbing, organic physical scrubbing, chemical scrubbing), PSA, membrane permeation, and/or cryogenic upgrading. For example, in one embodiment, the biogas upgrading system includes a dehumidifier, a scrubber, a membrane unit, a solvent extraction unit, a pressure swing adsorption unit, and/or a cryogenic unit.

In conventional biogas upgrading, the non-methane (e.g., $CO_2$, $H_2S$, $H_2O$, $N_2$, $O_2$, VOCs, and/or siloxane) removal systems are selected in dependence upon the source of the biogas, the non-methane components present, the desired purity, the capacity of the system, and other cleaning systems present, as would be understood by a person skilled in the art. For example, since each biogas source is unique, the biogas upgrading technology, configuration, and sizing of the system components is typically selected in dependence upon the specific situation. However, it can be challenging to determine the best gas upgrading technology when the carbon dioxide levels and biogas production levels (e.g., flow rates) vary with time.

With a centralized biogas upgrading system, the system advantageously can be designed to upgrade biogas from a number of different sources, and thus may provide a higher quality RNG and/or the flexibility to adjust to a varying biogas production (e.g., flow rates). For example, in some instances it may not be economically justifiable to provide $N_2$ removal for a small-scale biogas upgrading system (e.g., either stationary or mobile). However, by collecting and transporting partially purified biogas to a centralized biogas upgrading facility with $N_2$ removal, a higher $CH_4$ content can be achieved.

In one particularly advantageous embodiment, the partial purification system used at the pre-processing site is used to remove $CO_2$, but little to no $N_2$, while the centralized biogas upgrading facility includes $N_2$ removal. For example, in one embodiment the partial purification uses a membrane system to separate $CO_2$ and $CH_4$, while $N_2$ removal is achieved at the centralized biogas upgrading facility using a different technology and/or type of membrane. For example, PSA technology is efficient at removing $N_2$ from biogas.

In one embodiment, where the partial purification system used at the pre-processing site is used to remove $CO_2$, between 10% and 85% of the $CO_2$ is removed. In one embodiment where the partial purification system used at the pre-processing site is used to remove $CO_2$, between 20% and 80% of the $CO_2$ is removed. In one embodiment where the partial purification system used at the pre-processing site is used to remove $CO_2$, between 40% and 60% of the $CO_2$ is removed. In one embodiment where the partial purification system used at the pre-processing site is used to remove $CO_2$, between 84% and 90% of the $CO_2$ is removed. In one embodiment, the partial purification system used at the pre-processing site is used to remove more than 10% and less than 95% of the $CO_2$ in the biogas. For example, removing 10% of the $CO_2$ from a biogas containing 50% $CH_4$, 38% $CO_2$, 10% $N_2$, and 2% $O_2$, provides biogas containing 52% $CH_4$, 35.6% $CO_2$, 10.4% $N_2$, and 2.1% $O_2$, whereas removing 85% of the $CO_2$ from the biogas containing 50% $CH_4$, 38% $CO_2$, 10% $N_2$, and 2% $O_2$, provides biogas containing 73.9% $CH_4$, 8.4% $CO_2$, 14.8% $N_2$, and 3% $O_2$. Removing only enough $CO_2$ to yield a partially purified biogas having a $CH_4$ content that is less than 85% is advantageous in that such upgrading is relatively easy and/or can be achieved using commercial systems that are less costly. In one embodiment, sufficient $CO_2$ is removed so as to provide the partially purified biogas with a $CH_4$ content that is greater than 70% and less than 90%, which may provide a good balance between upgrading cost and compressibility.

Advantageously, the partially purified biogas transported to the biogas upgrading facility may be processed as an aggregate of gases. For example, in one embodiment, the partially purified biogas transported from a first pre-processing site is combined with partially purified biogas transported from a second other pre-processing site. In one embodiment, the partially purified biogas transported from a first pre-processing site is combined with raw biogas from another source. Treating an aggregate of gases in a biogas upgrading facility is advantageous in that it may improve flow rates, dilute impurities, and/or otherwise average out variability.

In one embodiment, the partially purified biogas transported from a first pre-processing site is combined with partially purified biogas transported from a second other pre-processing site within a receiving manifold, prior to any further purification. In one embodiment, the partially purified biogas transported from a first pre-processing site is combined with biogas (e.g., raw or partially purified) at a later stage within the upgrading process. For example, in one particularly advantageous embodiment, the partially purified biogas transported from a first pre-processing site is combined with other biogas (e.g., raw or partially purified) at a stage in the upgrading process selected in dependence upon the type and level of partial purification provide at the first pre-processing site.

In one embodiment, the partially purified biogas transported from a first pre-processing site is combined with other biogas (e.g., raw or partially purified) prior to any further purification of the partially purified biogas. In one embodiment, the partially purified biogas transported from a first pre-processing site is combined with other biogas (e.g., raw or partially purified) early in the biogas upgrading process (e.g., before or after $H_2S$ and/or $H_2O$ removal, but prior to $CO_2$ removal). In one embodiment, the partially purified biogas transported from a first pre-processing site is combined with other biogas (e.g., raw or partially purified) later in the biogas upgrading process (e.g., after $CO_2$ removal).

In one embodiment, the process includes: obtaining partially purified biogas derived from a first biogas source; transporting a first vessel containing the partially purified biogas derived from the first biogas source; removing the partially purified biogas derived from the first biogas source from the first vessel; combining the partially purified biogas derived from the first biogas source with biogas derived from a second other biogas source, thereby providing a combined biogas; purifying the combined biogas to provide renewable natural gas; and providing the renewable natural gas for at least one of injection into a natural gas distribution system and use as a transportation fuel. In one embodiment, the process comprises producing the partially purified biogas. In one embodiment, producing the partially purified biogas comprises removing water, hydrogen sulfide, and/or carbon dioxide from raw biogas obtained from the first source. In one embodiment, producing the partially purified biogas is produced by removing water, hydrogen sulfide, and carbon dioxide from raw biogas obtained from the first source. In one embodiment, producing the partially purified biogas includes removing between 0% and 5% of the carbon dioxide from the raw biogas. In one embodiment, producing the partially purified biogas includes removing between 10% and 90% of the carbon dioxide from the raw biogas. In one embodiment, producing the partially purified biogas includes removing more than 90% of the carbon dioxide from the raw biogas. In one embodiment, producing the partially purified biogas derived from the first biogas source does not include nitrogen removal, and purifying the combined biogas comprises removing nitrogen. In one embodiment, transporting the partially purified biogas derived from the first biogas source comprises transporting the partially purified biogas derived from the first biogas source from a first pre-processing site to a biogas upgrading facility, said first pre-processing site fed raw biogas from the first biogas source. In one embodiment, the biogas derived from a second other biogas source comprises partially purified biogas derived from the second other source. In one embodiment, the method comprises transporting the partially purified biogas derived from the second other biogas source from a second other pre-processing site to the biogas upgrading facility, said second other pre-processing site fed raw biogas from the second other biogas source. In one embodiment, the method comprises producing the partially purified biogas derived from the first biogas source with a stationary purification unit, and comprises compressing and feeding the partially purified biogas derived from the first biogas source into the first vessel as it is produced. In one embodiment, the partially purified biogas derived from the first biogas source has a methane content that is greater than an average methane content of raw biogas from the first biogas source, and that is less than an average methane content of the renewable natural gas produced. In one embodiment, the method comprises obtaining a fuel credit for the renewable natural gas. In one embodiment, the process includes identifying an entity having a renewable natural gas supply need for at least one of injection into a natural gas distribution system and use as a transportation fuel; and providing the renewable natural gas to the entity in an amount at least partially effective to fulfill the renewable natural gas supply need.

In one embodiment, the process includes: obtaining partially purified biogas from a plurality of pre-processing sites, each pre-processing site having a source of biogas and a stationary purification system; transporting the partially purified biogas obtained from each pre-processing site to a biogas upgrading facility, said transporting comprising transporting a plurality of vessels, each vessel containing partially purified biogas obtained from one of the pre-processing sites; further purifying transported partially purified biogas at the biogas upgrading facility to renewable natural gas; and providing the renewable natural gas for at least one of injection into a distribution system and use in transportation. In one embodiment, the partially purified biogas collected from the plurality of pre-processing sites has a non-methane content of at least 10%.

In one embodiment, the process includes: at a first location, installing a first biogas purification system for processing biogas from a first biogas source; at a second location, installing a second other biogas purification system for processing biogas from a second other biogas source; collecting or arranging for the collection of partially purified biogas produced at each of the first and second locations, said collecting comprising coupling a first vessel containing partially purified biogas derived from the first source to at least one of a truck, rail car, and ship, and transporting the first vessel containing the partially purified biogas; removing at least one of carbon dioxide and nitrogen from the collected partially purified biogas derived from the first biogas source and the second other biogas source to produce renewable natural gas; and providing the renewable natural gas.

In one embodiment, the process includes: at a pre-processing site, removing at least one of water, hydrogen sulfide, and carbon dioxide from raw biogas provided from a first biogas source to produce partially purified biogas, compressing the partially purified biogas, and feeding the compressed partially purified biogas to a vessel as it is produced; transporting the partially purified biogas to a biogas upgrading facility, said transporting comprising moving said vessel; further purifying the partially purified biogas transported to the biogas upgraded facility to produce renewable natural gas; and providing the renewable natural gas for at least one of injection into a natural gas distribution system and use as a transportation fuel.

Providing RNG

In general, the RNG produced at the centralized biogas upgrading facility is provided to a user and/or distribution system (e.g., the US natural gas grid) using any suitable method. For example, in one embodiment, the RNG is injected directly into the distribution system. In one embodiment, the RNG is transported (e.g., by truck, rail, or ship) to another location where it is injected into the distribution system. In one embodiment, the RNG is compressed for storage and/or to provide compressed renewable natural gas (bio-CNG). In one embodiment, the RNG is used to provide liquefied renewable natural gas (bio-LNG). Bio-CNG and/or bio-LNG can be transported to an off-grid industrial site and/or provided to a filling station for use in transportation.

In embodiments where the RNG is injected into distribution system, the RNG is typically compressed to pipeline pressure for the injection. When RNG is injected into the distribution system, an equivalent amount of gas (i.e., measured in MMBTU) can be withdrawn at a different location. Since many NG distribution systems may recognize the transfer or allocation of the environmental attributes of RNG injected into the distribution system to gas withdrawn at a different location, the withdrawn gas may be considered a renewable fuel. In general, the transfer is made on a displacement basis, where transactions within the distribution system involve a matching and balancing of inputs and outputs. Typically the direction of the physical flow of gas is not considered.

In one embodiment, a fuel credit or renewable energy credit associated with the RNG is generated or caused to be generated. The term "cause" or "causing", as used herein, refers to arranging or bringing about a specific result (e.g., a withdrawal of a gas from a distribution system), either directly or indirectly, or playing a role in a series of activities through commercial arrangements such as a written agreement, verbal agreement, or contract.

The term "credit", "renewable fuel credit", or "fuel credit", as used herein, refers to any rights, credits, revenues, offsets, greenhouse gas rights, or similar rights related to carbon credits, rights to any greenhouse gas emission reductions, carbon-related credits or equivalent arising from emission reduction trading or any quantifiable benefits (including recognition, award or allocation of credits, allowances, permits or other tangible rights), whether created from or through a governmental authority, a private contract, or otherwise. The renewable fuel credit may be a certificate, record, serial number or guarantee, in any form, including electronic, which evidences production of a quantity of fuel meeting certain life cycle GHG emission reductions relative to a baseline (e.g., a gasoline baseline) set by a government authority.

The generation of fuel credits or renewable energy credit associated with the RNG may be related to the environmental attributes of the RNG and/or the corresponding life cycle GHG emissions. To determine life cycle GHG emissions associated with a fuel, analyses are conducted to calculate the GHG emissions related to the production and use of the fuel throughout its life cycle. Life cycle GHG emissions include the aggregate quantity of GHG emissions related to the full life cycle of the transportation fuel, including all stages of fuel and feedstock production and distribution, from feedstock generation or extraction, through the distribution and delivery, and use of the finished fuel to the ultimate consumer. GHG emissions typically account for total net GHG emissions, both direct and indirect, associated with feedstock production and distribution, the fuel production, and distribution and use.

In one embodiment, the RNG is provided for use as a transportation fuel and a fuel credit is generated or caused to be generated. Providing the RNG for transportation use is advantageous because fuel credits can be lucrative. Examples of fuel credits include, Renewable Identification Numbers (RINs) under the United States Environmental Protection Agency (EPA) Renewable Fuel Standard and carbon credits under state supported low carbon fuel standards within the United States (e.g., The Low Carbon Fuel Standard in California).

In one embodiment, the generation of fuel credits is enabled by the transfer or allocation of the environmental attributes of the RNG injected into a distribution system to the natural gas withdrawn from the distribution system. The transfer or allocation of environmental attributes may be evidenced by a contract or other commercial arrangement (e.g., may or may not involve transfer of ownership). By transferring or allocating "environmental attributes", it is meant that the natural gas withdrawn from the distribution system for transportation use is considered to have the GHG emission properties of the RNG injected, as can be readily determined by those of skill in the art.

In one embodiment, inputs and outputs to the natural gas distribution system are tracked by flow meters and/or electronic recording. In one embodiment, inputs and outputs are traced using energy delivered. The term "energy delivered", as used herein, is a measure of the amount of energy delivered to or from the distribution system in a particular time period, or series of time periods (e.g., discrete increments of time), such as, without limitation, hourly, daily, weekly, monthly, quarterly, or yearly intervals. The energy delivered may be obtained after determining values representing the energy content and volume of flow for a particular time period. For example, the energy delivered may be provided in units of gigajoules (GJ), million British thermal units (MMBtu), or British thermal units (Btu)) over a given time period.

In one embodiment, the natural gas withdrawn for transportation use or the renewable natural gas produced at the upgrading facility is used as an intermediate or a feedstock to produce the transportation fuel. For example, the natural gas to which the environmental attributes have been transferred may be chemically reacted to produce renewable hydrogen, which in turn is used in a process to produce a renewable liquid transportation fuel, a partially renewable liquid transportation fuel, or a liquid transportation fuel having renewable content. In certain embodiments, the renewable hydrogen may be combined with a crude oil derived liquid hydrocarbon so that it becomes incorporated into the hydrocarbon and ultimately becomes part of the liquid transportation fuel that is the product of the fuel production facility.

In one embodiment, the RNG or natural gas withdrawn for transportation use is used as a transportation fuel that has life cycle GHG emissions that are at least 20% less than the life cycle GHG emissions of a gasoline baseline using EPA methodology, preferably at least 50% or 60% less.

DESCRIPTION OF EMBODIMENTS OF THE INVENTION

Figure 3A:
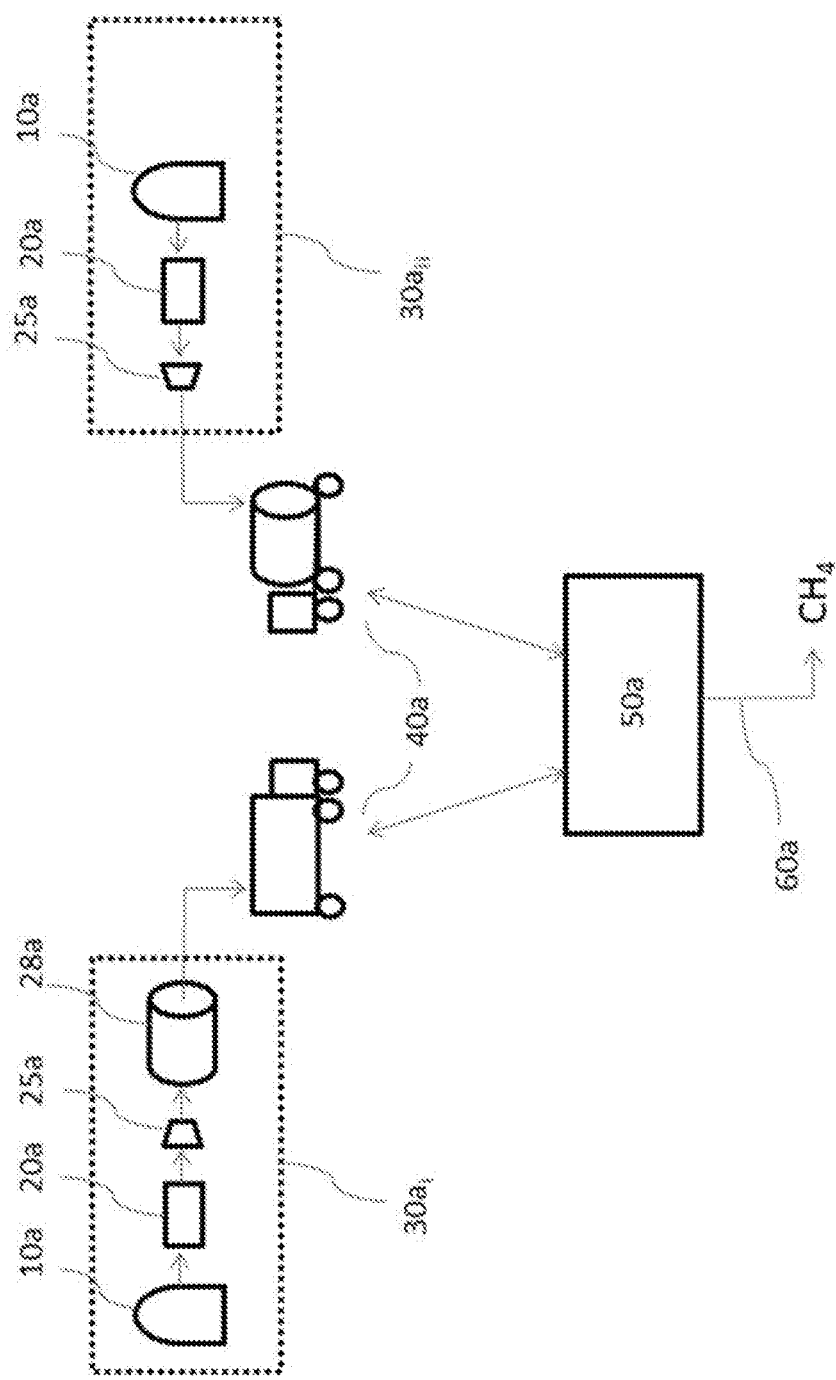
FIG. 3a is a schematic diagram showing a system for providing RNG in accordance with an embodiment of the invention.

FIG. 3a shows an embodiment of a system in accordance with an embodiment of the invention. The system includes a plurality of pre-processing sites $30a_i$, $30a_{ii}$, each of which includes a source of raw biogas $10a$ (e.g., feed from landfill, anaerobic digester, and/or biogas pipeline) and a partial purification system $20a$ (i.e., for removing $H_2O$, $H_2S$, and/or $CO_2$ from the raw biogas), and optionally includes a compressor system $25a$ and/or a storage system $28a$. The system also includes a collection system $40a$ (e.g., including one or more trucks, ships, or rail), for collecting and transporting the partially purified biogas produced at each biogas pre-processing site $30a_i$, $30a_{ii}$, to a centralized biogas upgrading facility $50a$. The centralized biogas upgrading facility includes a system $60a$ for providing RNG.

Advantageously, since the centralized biogas upgrading facility $50a$ can receive partially purified biogas from a plurality of pre-processing sites, it may be a relatively large scale facility and may profit from the economies of scale. In comparison to a small-scale biogas upgrading system (e.g., farm-scale or mobile), a large-scale biogas upgrading system (e.g., >6000 SCFM) can remove more impurities (e.g., providing a methane content of at least 98%) at a reasonable cost.

Figure 3B:
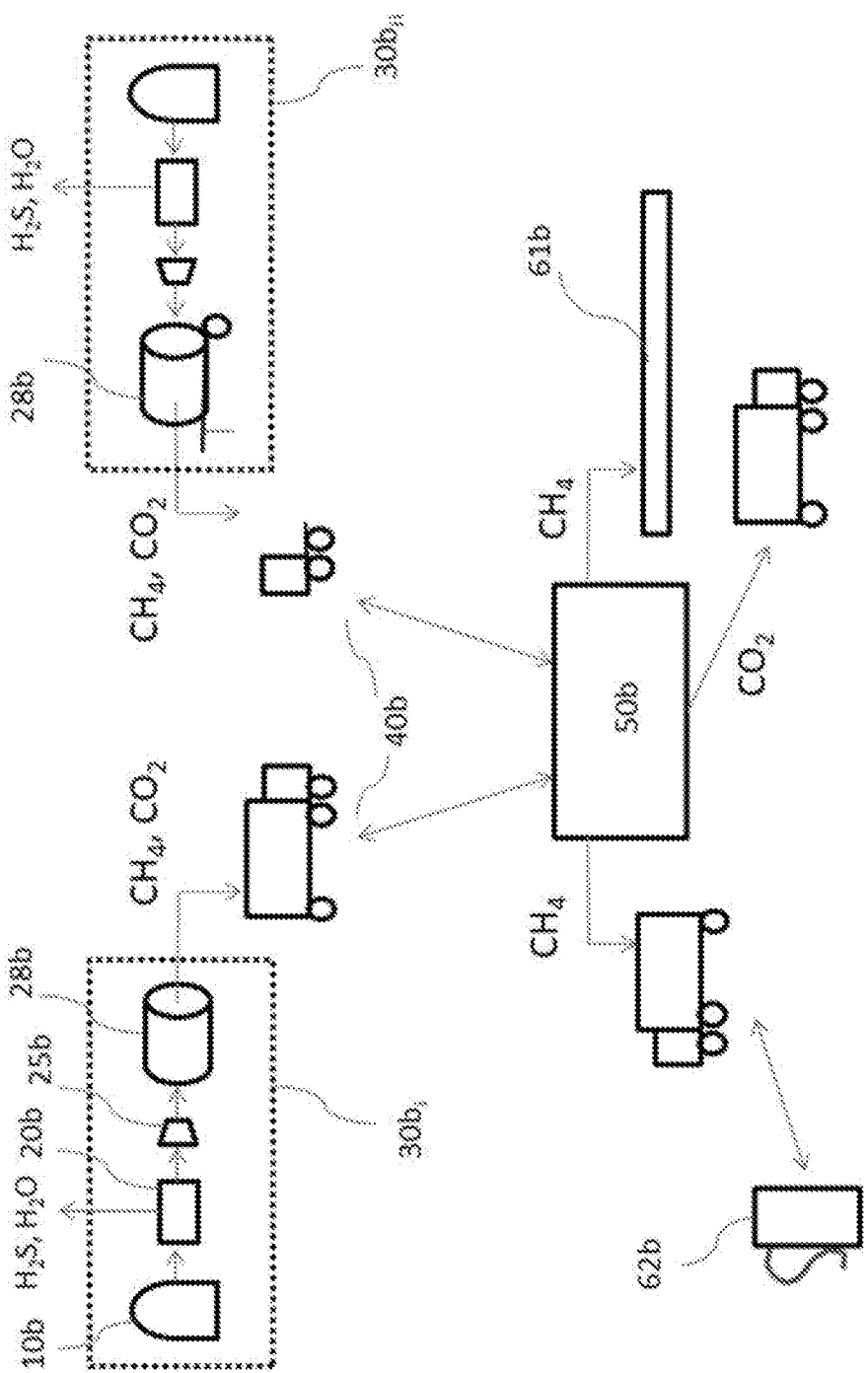
FIG. 3b is a schematic diagram showing a system for providing RNG in accordance with another embodiment of the invention.

FIG. 3b shows an embodiment of a system in accordance with one embodiment of the invention. The system includes a plurality of pre-processing sites $30b_i$, $30b_{ii}$, each of which includes a source of raw biogas $10b$ (e.g., feed from landfill, anaerobic digester, and/or biogas pipeline) and a partial purification system $20b$ (i.e., for removing $H_2O$ and/or $H_2S$ from the biogas), and optionally includes a compressor system $25b$ and/or a storage system $28b$. The system also includes a collection system $40b$ (e.g., including one or more trucks, ships, or rail), for transporting the partially purified biogas produced at each site $30b_i$, $30b_{ii}$ to a centralized biogas upgrading facility 50*b*. Also included is a system for injecting the RNG into a distribution system 61*b* and/or a system for transporting RNG (e.g., compressed or liquefied) to a filling station 62*b*. The RNG can be used as a transportation fuel and fuel credits may be generated.

In this embodiment, the partial purification system 20*b* at the pre-processing sites 30*$b_i$*, 30*$b_{ii}$* removes $H_2O$ and $H_2S$, but does not significantly remove $CO_2$. Accordingly, the partial purification reduces corrosion and/or other complications, but does not significantly improve compression. Rather, the $CO_2$ derived from the raw biogas is primarily removed at the centralized biogas upgrading plant, where it may be vented or provided as a value-added product. This configuration is particularly advantageous when the $CO_2$ is removed by scrubbing, as such systems particularly benefit from the economies of scale.

Figure 3C:
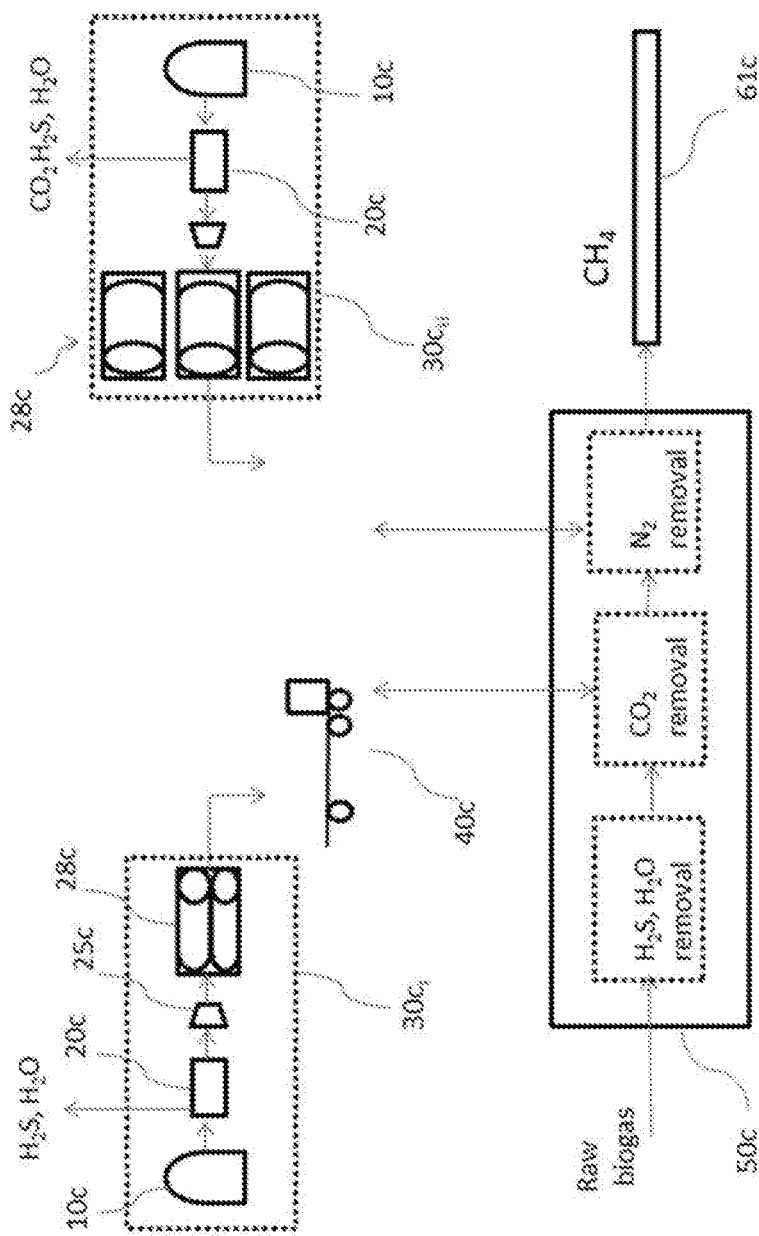
FIG. 3c is a schematic diagram showing a system for providing RNG in accordance with another embodiment of the invention.

FIG. 3*c* shows an embodiment of a system in accordance with one embodiment of the invention. The system includes a plurality of pre-processing sites 30*$c_i$*, 30*$c_{ii}$*, each of which includes a source of raw biogas 10*c* (e.g., feed from landfill, anaerobic digester, and/or a biogas pipeline) and a partial purification system 20*c* (i.e., for removing $H_2O$, $H_2S$, and/or $CO_2$ from the raw biogas), and optionally includes a compressor system 25*c* and/or a storage system 28*c*. The system also includes a collection system 40*c* (e.g., including one or more trucks, ships, or rail, and optionally including a biogas pipeline), for transporting the partially purified biogas produced at each pre-processing site 30*$c_i$*, 30*$c_{ii}$* to the centralized biogas upgrading facility 50*c*. The centralized biogas upgrading facility includes a system for 61*c* for providing RNG (e.g., compressed or liquefied). The RNG can be used for transportation and fuel credits generated.

In this embodiment, the partial purification system 20*c* at the first pre-processing site 30*$c_i$* removes $H_2O$ and $H_2S$, and either removes no $CO_2$ or removes an inadequate amount of $CO_2$ to provide RNG (i.e., the resulting partially purified biogas must undergo further $CO_2$ removal to qualify as RNG). The partial purification system 20*c* at the second pre-processing site 30*$c_{ii}$* removes most of the $CO_2$ in the raw biogas, but the resulting partially purified biogas must undergo $N_2$ removal to qualify as RNG. For example, the partial purification system 20*c* at 30*$c_{ii}$* may include a membrane system or scrubbing system for removing $CO_2$ with low methane loss. In this embodiment, the partially purified biogas transported from the first pre-processing site 30*$c_i$* and the partially purified biogas transported from the second pre-processing site 30*$c_{ii}$* are introduced into different stages of the biogas upgrading process. For example, since the partially purified biogas transported from the first pre-processing site 30*$c_i$* has already been subject to $H_2O$ and/or $H_2S$ removal, but still needs the $CO_2$ content to be reduced, it is introduced downstream of the $H_2O$ and/or $H_2S$ removal stage, but upstream of or into the $CO_2$ removal stage. Since the partially purified biogas transported from the second pre-processing site 30*$c_{ii}$* has already been subject to adequate $CO_2$ removal, it is introduced downstream of the $CO_2$ removal stage (e.g., upstream of or into the $N_2$ removal stage).

Advantageously, this configuration enables $N_2$ to be removed from the biogas obtained at pre-processing site 30*$c_{ii}$* at relatively low cost (e.g., compared to using a small scale or mobile biogas upgrading system). For example, since not all biogas production plants produce enough biogas to justify investing in $N_2$ rejection, providing partial purification and transport to an upgrading facility allows the partially purified biogas to be further polished to pipeline standards using technologies and/or system not economically feasible on a small scale.

In this embodiment, the partially purified biogas transported from the first pre-processing site 30*$c_i$* is optionally combined with biogas derived from a different source prior to or during treatment in the $CO_2$ stage of the process. The partially purified biogas transported from the second pre-processing site 30*$c_{ii}$* is optionally combined with biogas derived from the first pre-processing site 30*$c_i$* and/or biogas derived from a different source prior to or during the treatment in the $N_2$ removal stage of the process.

In addition to removing redundant steps (e.g., the partially purified biogas transported from the second pre-processing site 30*$c_{ii}$* is only treated to remove $CO_2$ once), this configuration may reduce compression costs and/or may improve the removal of $CO_2$. For example, consider the following. The partially purified biogas transported from the plurality of pre-processing sites 30*$c_i$*, 30*$c_{ii}$* can be at a relatively high pressure (e.g., 2400-3600 psi) in these embodiments. Prior to being fed into the biogas upgrading system 50*c*, it typically will be decompressed. Early stages of the biogas upgrading process may be designed to process raw biogas at low pressure (e.g., <10 psi), whereas later stages (e.g., $CO_2$ removal) may benefit from higher pressures (e.g., 200 psi). By introducing the partially purified biogas into a stage in the process that requires and/or benefits from relatively high pressures, the decompression required for the earlier low pressure stage and subsequent recompression required for a subsequent high pressure stage is avoided. Moreover, since many $CO_2$ removal technologies, such as membrane separation, may perform better at higher pressures, this configuration may improve $CO_2$ removal.

Figure 3D:
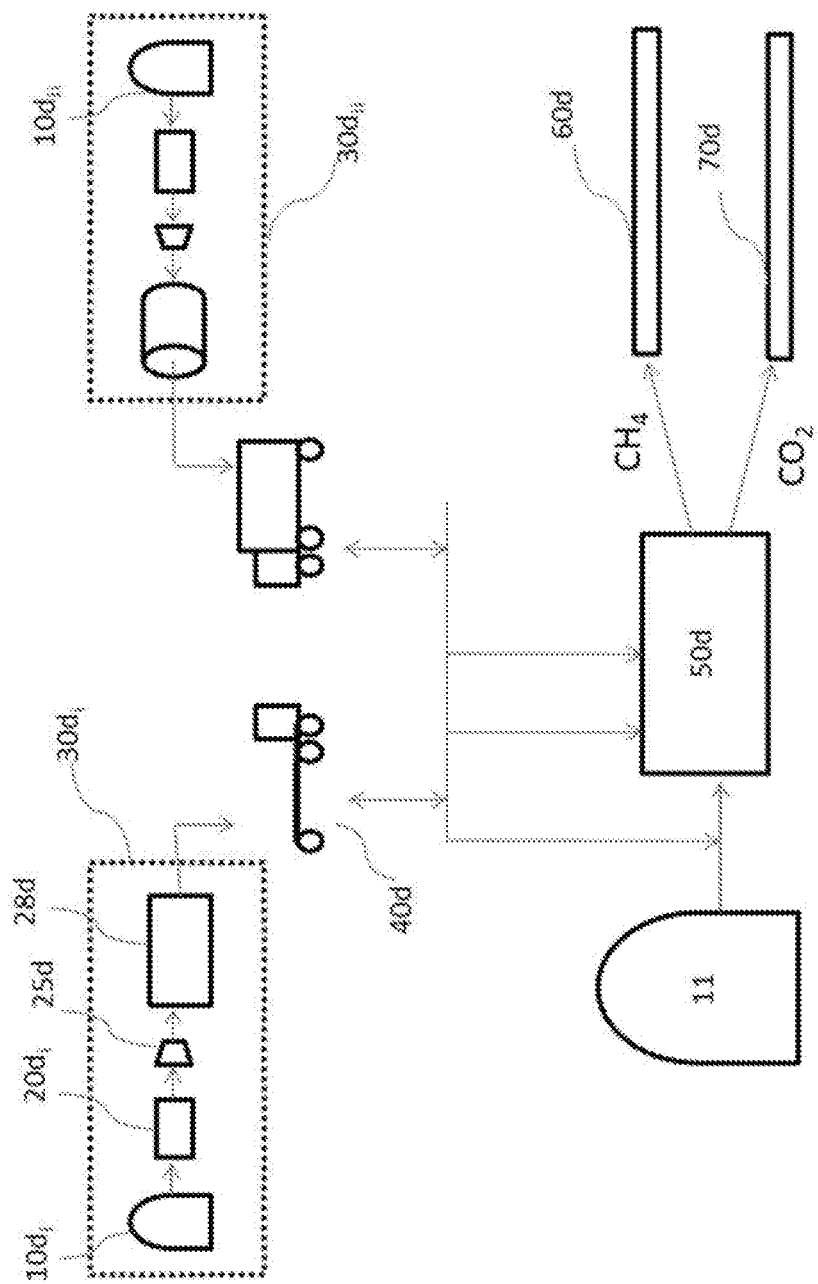
FIG. 3d is a schematic diagram showing a system for providing RNG in accordance with another embodiment of the invention.

FIG. 3*d* shows an embodiment of a system in accordance with one embodiment of the invention. The system includes one or more pre-processing sites 30*$d_i$*, 30*$d_{ii}$*, each of which includes a source of biogas 10*d* (e.g., feed from landfill, anaerobic digester, and/or biogas pipeline) and a partial purification system 20*d* (i.e., for removing $H_2O$, $H_2S$, and/or $CO_2$ from the raw biogas), and optionally includes a compressor system 25*d* and/or a mobile storage system 28*d*. The system also includes a collection system 40*d* (e.g., including one or more trucks, ships, or rail, and a biogas pipeline system), for transporting the partially purified biogas produced at each pre-processing site 30*$d_i$*, 30*$d_{ii}$* directly to a centralized biogas upgrading facility 50*d*. The centralized biogas upgrading facility includes a system for distributing the RNG 60*d* (e.g., injection into a distribution system). Optionally, the system includes a system for injecting compressed $CO_2$ into a $CO_2$ pipeline system 70*d*.

In this embodiment, the centralized biogas upgrading facility 50*d* is located at or near, and/or is fed raw biogas directly from, a landfill 11. In this case, the partially purified biogas collected from the one or more pre-processing biogas production sites (i.e., illustrated as two sites 30*$d_i$*, 30*$d_{ii}$*, but could be more or less), supplements the flow of biogas to the biogas upgrading system, thereby providing flexibility to adjust to varying biogas production (e.g., flow rates), and/or profiting from the economies of scale.

In this embodiment, the partially purified biogas derived from the first biogas source 10*$d_i$* may combined with the partially purified biogas derived from the second source 10*$d_{ii}$* within the receiving manifold that feeds the biogas upgrading system 50*d*, and/or can be combined with biogas derived from the landfill site 11 at a selected stage in the process.

The embodiment discussed with reference to FIG. 3*d* is particularly advantageous. For example, since landfill sites can produce large quantities of biogas (e.g., 10,000 SCFM), the landfill can provide the primary source of biogas and/or justification for the centralized biogas upgrading facility. When biogas production at the landfill wanes (e.g., as the landfill ages), the number of and/or contribution from pre-processing sites may be increased.

In addition, these configurations may be particularly advantageous because, since the partially purified biogas typically will be compressed to a relatively high pressure in the mobile storage system (e.g., greater than 1000 psig), the use of a biogas purification technology that uses higher pressures (e.g., greater than 200 psig, greater than 300 psig, greater than 400 psig, or greater than 400 psig), may be more attractive.

In one embodiment, the relatively high pressure of the partially purified biogas is exploited in the centralized biogas upgrading. For example, carbon dioxide may be removed from biogas using a two stage membrane system using an inlet pressure of about 100 psig or 200 psig. However, by using a higher inlet pressure (e.g., greater than 600 psig or greater than 800 psig), a single stage membrane can be used to remove about the same amount of carbon dioxide. While it is normally challenging to justify the increased compression costs corresponding to higher pressures, since the partially purified biogas may be compressed to above 1000 psig as it fills the mobile storage system, the increased cost may be offset. In one embodiment, the partially purified biogas is fed to a membrane system at a pressure greater than 200 psig, greater than 300 psig, greater than 400 psig, greater than 500 psig, greater than 600 psig, greater than 700 psig, or greater than 800 psig.

In one embodiment, the partially purified biogas is fed to a $CO_2$ removal that uses scrubbing (e.g., Selexol™ or water), which removes most of the $CO_2$ and preserves the pressure of the resulting gas stream. Depressurization of the resulting gas can cool that gas and/or gas from the landfill to create conditions for cryogenic separation of the $CH_4$ from $N_2$.

In the embodiments illustrated in FIGS. 3a to 3d, the pre-processing biogas production sites (e.g., $30a_i$, $30d_i$, $30d_{ii}$) have a partial purification system used for removing $H_2O$, $H_2S$, and/or $CO_2$ from raw biogas (e.g., leaving a non-methane content of at least 10%). Although such systems are less costly than small-scale biogas upgrading systems that provide pipeline quality upgraded biogas, it can still be an added expense for farmers and/or small scale landfills.

In accordance with one embodiment of the invention, another party (e.g., separate from the biogas producer) arranges for the provision, installation, and/or operation of the partial purification system at the pre-processing biogas production site (and optionally a plurality of other pre-processing sites), and for the collection and transport of the partially purified biogas from each pre-processing site to the centralized biogas upgrading system. Accordingly, there is additional incentive for small scale biogas sources to upgrade raw biogas to pipeline quality. In particular, this embodiment makes biogas upgrading accessible to any small scale biogas source. More specifically, it opens up additional options for small biogas sources (e.g., individual farms) located far from a biogas grid.

Providing, installing, and/or operating a remote partial purification system is advantageous with regard to the collection of the partially purified biogas. For example, it allows partially purified biogas to be produced prior to collection thereof, thereby improving the speed of the collection. In addition, it allows the partially purified biogas to be compressed and fed directly into a mobile storage tank, which may obviate using buffer storage and/or flaring of excess biogas, and improves the collection by allowing the transport of relatively large batches of partially purified biogas (e.g., in a hub-and-spoke configuration). For example, it is more efficient to transport one large batch directly to the biogas upgrading facility, than to provide a successive collection where smaller volumes are collected at a plurality of sites before being transported to the centralized biogas upgrading facility.

Providing, installing, and/or operating a remote partial purification system, and collecting the partially purified biogas for transport to the centralized biogas upgrading facility is advantageous for the biogas upgrading facility in that it merits providing a larger and/or more efficient biogas upgrading system. Economies of scale indicate that larger plants are favored for producing higher quality gas, lower methane losses, higher plant efficiency, and higher profitability.

In the embodiments illustrated in FIGS. 3a to 3d, the centralized biogas upgrading system not only provides improved biogas upgrading, but can also provide a centralized injection into the distribution system. This is advantageous because even if upgrading to pipeline quality is economically feasible for a given situation, injection into a distribution system or a commercial fuel station may not be possible and/or may be unfavorable.

Advantageously, the embodiments described herein provide lower capital cost per unit of RNG used for fuel credit generation, making the use of biogas for use in transportation economically practical. Furthermore, it allows impractically small biogas productions to be to be collected and used, which reduces overall GHG emissions. By upgrading impractically small biogas productions to pipeline standards (e.g., provide RNG) for transportation use, overall GHG emissions are further reduced.

Of course, the above embodiments have been provided as examples only. It will be appreciated by those of ordinary skill in the art that various modifications, alternate configurations, and/or equivalents will be employed without departing from the spirit and scope of the invention. Accordingly, the scope of the invention is therefore intended to be limited solely by the scope of the appended claims.

The invention claimed is:

1. A method for upgrading biogas comprising:
   (a) obtaining biogas from a plurality of biogas sources, including a first biogas from a first biogas source and a second other biogas from a second other biogas source;
   (b) removing one or more components from the first biogas to produce a first partially purified biogas having a non-methane content of at least 10%, said one or more components comprising hydrogen sulfide, carbon dioxide, or a combination thereof, said one or more components removed using at least one stationary purification system;
   (c) transporting a first vessel containing the first partially purified biogas from the first biogas source directly to a biogas upgrading facility;
   (d) removing one or more components from the second biogas to produce a second partially purified biogas, said one or more components comprising hydrogen sulfide, carbon dioxide, or a combination thereof, said one or more components removed using at least one stationary purification system;
   (e) transporting a second vessel containing the second partially purified biogas from the second biogas source directly to the biogas upgrading facility;

(f) at the biogas upgrading facility, removing at least one component from a gas stream comprising the first partially purified biogas, the second partially purified biogas, or a combination thereof, to produce renewable natural gas having a heating value that is greater than a heating value of any one of the first and second partially purified biogases;

(g) providing the renewable natural gas produced in f) for injection into a distribution system, for use as a transportation fuel, or for a combination thereof.

2. The method according to claim 1, wherein the one or more components removed in step (b) comprise carbon dioxide.

3. The method according to claim 2, wherein the at least one component removed in step (f) comprises carbon dioxide.

4. The method according to claim 3, wherein the first partially purified biogas has a heating value of at least 750 BTU/scf and less than 925 BTU/scf.

5. The method according to claim 2, wherein step (b) comprises removing at least 50% of the carbon dioxide in the first biogas.

6. The method according to claim 2, wherein step (b) comprises removing at least 75% of the carbon dioxide in the first biogas.

7. The method according to claim 2, wherein step (b) comprises removing at least 85% of the carbon dioxide in the first biogas.

8. The method according to claim 2, wherein the first partially purified biogas has a carbon dioxide content that is less than 8%.

9. The method according to claim 1, wherein the first partially purified biogas has a nitrogen content that is at least 5%, and where step f) comprises removing nitrogen.

10. The method according to claim 1, wherein the one or more components removed in steps (b) and (d) comprise carbon dioxide, water, and hydrogen sulfide.

11. The method according to claim 4, wherein the one or more components removed in steps (b) and (d) comprise carbon dioxide, water, and hydrogen sulfide.

12. The method according to claim 1, wherein the plurality of biogas sources comprises a third biogas source, wherein the biogas upgrading facility is connected to the third biogas source by a piping system, and wherein the third biogas source is a landfill.

13. The method according to claim 1, wherein the first vessel is transported to the biogas upgrading facility by vehicle, wherein the vehicle is a truck, rail car, or ship.

14. The method according to claim 1, wherein the first vessel is transported to the biogas upgrading facility in a trailer, by truck.

15. The method according to claim 1, wherein the first vessel is filled with the first partially purified biogas to a pressure of at least 1000 psig.

16. The method according to claim 1, wherein step b) comprises subjecting the first biogas from the first biogas source to a membrane separation.

17. The method according to claim 1, wherein the first and second vessels are powered by natural gas, renewable natural gas, or a combination thereof.

18. The method according to claim 1, wherein the plurality of biogas sources are selected to provide the biogas upgrading facility with biogas at rate of at least 2,000 SCFM.

19. The method according to claim 1, wherein the plurality of biogas sources are selected to provide the biogas upgrading facility with biogas at rate of at least 5,000 SCFM.

20. A method for upgrading biogas comprising:

(a) obtaining biogas from a plurality of biogas sources, including a first biogas from a first biogas source and a second other biogas from a second other biogas source;

(b) feeding the first biogas into a first stationary purification system to remove hydrogen sulfide, carbon dioxide, or a combination thereof from the first biogas and produce a first partially purified biogas having a heating value that does not exceed 900 BTU/scf;

(c) transporting a first vessel containing the first partially purified biogas from the first biogas source directly to a biogas upgrading facility by vehicle;

(d) feeding the second biogas into a second other stationary purification system to remove hydrogen sulfide, carbon dioxide, or a combination thereof from the second biogas and produce a second partially purified biogas having a heating value that does not exceed 900 BTU/scf;

(e) transporting a second vessel containing the second partially purified biogas from the second biogas source directly to the biogas upgrading facility by vehicle;

(f) at the biogas upgrading facility, feeding the first and second partially purified biogases into one or more purification systems to remove carbon dioxide, nitrogen, oxygen, or any combination thereof and to produce renewable natural gas having a heating value that is at least 950 BTU/scf;

(g) providing renewable natural gas produced in f) for injection into a distribution system, for use as a transportation fuel, or for a combination thereof.

21. The method according to claim 1, wherein at least one of the first and second biogas sources produces raw biogas at a rate between 100 SCFM and 3000 SCFM.

22. The method according to claim 1, wherein at least one of the first and second biogas sources produces raw biogas at a rate between 3000 SCFM and 6000 SCFM.

* * * * *

UNITED STATES PATENT AND TRADEMARK OFFICE
CERTIFICATE OF CORRECTION

PATENT NO. : 10,760,024 B2  Page 1 of 1
APPLICATION NO. : 16/556944
DATED : September 1, 2020
INVENTOR(S) : Patrick J. Foody It is certified that error appears in the above-identified patent and that said Letters Patent is hereby corrected as shown below:

On page 2, Column 2, item (56), other publications, Line 16, delete "4.pdt," and insert --4.pdf,--.

On page 2, Column 2, item (56), other publications, Line 27, delete "Colarado." and insert --Colorado.--.

In Column 6, Line 45, delete "30i," and insert --$30_i$,--.

In Column 11, Line 4, delete "permaselectivity" and insert --permselectivity--.

In Column 11, Line 28, delete "mob" and insert --mobile--.

In Column 14, Line 34, delete "pre-preprocessing" and insert --pre-processing--.

In Column 22, Line 8, delete "(Btu))" and insert --(Btu)--.

In Column 22, Line 45, delete "$30a_{ii}$," and insert --$30a_{ii}$--.

In Column 23, Line 7, delete "$30b_i$, $30b_{ii}$" and insert --$30b_i$ and $30b_{ii}$--.

In Column 27, Line 8, Claim 1, delete "f)" and insert --step (f)--.

In Column 27, Line 34, Claim 9, delete "f)" and insert --(f)--.

In Column 28, Line 1, Claim 16, delete "b)" and insert --(b)--.

Signed and Sealed this
Seventeenth Day of November, 2020

Andrei Iancu
*Director of the United States Patent and Trademark Office*